US010261910B2

(12) United States Patent
Turner et al.

(10) Patent No.: US 10,261,910 B2
(45) Date of Patent: Apr. 16, 2019

(54) CACHE LINE COMPACTION OF COMPRESSED DATA SEGMENTS

(71) Applicant: QUALCOMM Incorporated, San Diego, CA (US)

(72) Inventors: Andrew Edmund Turner, San Diego, CA (US); George Patsilaras, Del Mar, CA (US); Bohuslav Rychlik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/077,534

(22) Filed: Mar. 22, 2016

(65) Prior Publication Data

US 2016/0203084 A1    Jul. 14, 2016

Related U.S. Application Data

(63) Continuation of application No. 14/451,639, filed on Aug. 5, 2014, now Pat. No. 9,361,228.

(51) Int. Cl.
*G06F 12/0802* (2016.01)
*G06F 12/0875* (2016.01)
*G06F 12/0886* (2016.01)

(52) U.S. Cl.
CPC ...... *G06F 12/0875* (2013.01); *G06F 12/0802* (2013.01); *G06F 12/0886* (2013.01);
(Continued)

(58) Field of Classification Search
CPC .............. F06F 12/0864; G06F 12/0886; G06F 2212/6032; G06F 2212/401
See application file for complete search history.

(56) References Cited

U.S. PATENT DOCUMENTS 6,735,673 B2    5/2004  Kever
7,143,238 B2   11/2006  Adl-Tabatabai et al.
(Continued)

FOREIGN PATENT DOCUMENTS

JP    H07129470 A    5/1995
JP    H08249159 A    9/1996

OTHER PUBLICATIONS

Alameldeen A.R., et al., "Adaptive Cache Compression for High-performance Processors", 31st Annual International Symposium on Computer Architecture (ISCA-31), Munich, Germany, Jun. 19-23, 2004, IEEE, Piscataway, NJ, USA, pp. 212-223, XP010769412, DOI: 10.1109/ISCA.2004.1310776 ISBN: 978-0-7695-2143.
(Continued)

*Primary Examiner* — Tracy A Warren
(74) *Attorney, Agent, or Firm* — The Marbury Law Group, PLLC

(57) ABSTRACT

Methods, devices, and non-transitory process-readable storage media for compacting data within cache lines of a cache. An aspect method may include identifying, by a processor of the computing device, a base address (e.g., a physical or virtual cache address) for a first data segment, identifying a data size (e.g., based on a compression ratio) for the first data segment, obtaining a base offset based on the identified data size and the base address of the first data segment, and calculating an offset address by offsetting the base address with the obtained base offset, wherein the calculated offset address is associated with a second data segment. In some aspects, the method may include identifying a parity value for the first data segment based on the base address and obtaining the base offset by performing a lookup on a stored table using the identified data size and identified parity value.

32 Claims, 14 Drawing Sheets

(52) U.S. Cl.
CPC ............... *G06F 2212/1021* (2013.01); *G06F 2212/401* (2013.01); *G06F 2212/45* (2013.01); *G06F 2212/608* (2013.01)

(56) References Cited

U.S. PATENT DOCUMENTS

| | | |
|---|---|---|
| 7,162,583 B2 | 1/2007 | Adl-Tabatabai et al. |
| 7,257,693 B2 | 8/2007 | Newburn et al. |
| 8,341,380 B2 | 12/2012 | Deming et al. |
| 2003/0131184 A1* | 7/2003 | Kever ............... G06F 12/0802 711/100 |
| 2004/0073741 A1* | 4/2004 | Klein ............... G06F 12/0886 711/3 |
| 2005/0144387 A1 | 6/2005 | Adl-Tabatabai et al. |
| 2006/0184734 A1 | 8/2006 | Fluhr et al. |
| 2012/0102295 A1* | 4/2012 | Yang ............... G06F 12/023 711/206 |
| 2016/0041905 A1 | 2/2016 | Turner et al. |

OTHER PUBLICATIONS

International Search Report and Written Opinion—PCT/US2015/039736—ISA/EPO—dated Oct. 14, 2015.

\* cited by examiner

Pseudo code A getNewAddress_oddOrEven( *Base_Address, Compression_Ratio*)             400
{
    // shift right to get bit 8
    *Shift = Base_Address* >> 8;

// AND operation to see if bit 8 is 1 or 0
    //0 = even, 1 = odd
    *Parity = Shift* & 1;

//Use *Parity* to select a value from table of offsets corresponding to
    compression and odd or even parity value
    //TableLookup may be function to retrieve a value from 2D array (e.g., FIG. 3)
    *Offset* = TableLookup[ *Compression_Ratio* ][ *Parity* ];

//return the Base_Address that is offset by the selected table value
    return (*Base_Address + Offset*);
}

FIG. 4A

Example call of Pseudo code A (FIG. 4A)

450

//Use *Base_Address* = base physical address of a data segment
*Base_Address* = ...100000000;

//use 4:4 compression ratio
*Compression_Ratio* = 4:4;

//call pseudo code function to get the new physical address
*new_address* = getNewAddress_oddOrEven( ...100000000, 4:4);

FIG. 4B

Example values in function of Pseudo code A as called in FIG. 4B:

getNewAddress_oddOrEven( *Base_Address, Compression_Ratio*)
{
    //parameter values from call:
        //*Base_Address* = ...100000000;
        //*Compression_Ratio* = 4:4;

460

// shift right to get bit 8
    *Shift* = *Base_Address* >> 8 = ...100000000 >> 8 = ...000000010;

// AND operation to see if bit 8 is 1 or 0
    //0 = even, 1 = odd
    *Parity* = *Shift* & 1 = ...000000010 & 000000001 = 0;

//Use *Parity* to select a value from table of offsets corresponding to compression and
        odd or even parity value
    //TableLookup may be function to retrieve a value from 2D array
    *Offset* = TableLookup[ *Compression_Ratio* ][ *Parity* ] = TableLookup [4:4][0] = 64 Bytes;

//return the Base_Address that is offset by the selected table value
    return (*Base_Address* + *Offset*) = (...100000000 + 64 Bytes);
}

FIG. 4C

| Compression Ratio | Base Address Parity Bit 9, 8 | | | |
|---|---|---|---|---|
| | 00 | 01 | 10 | 11 |
| 4:1 | 256 | 64 | 128 | -64 |
| 4:2 | 128 | 128 | 0 | 0 |
| 4:3 | 128 | 64 | 0 | -64 |
| 4:4 | 64 | -256 (64B)<br>64 (192B) | 0 (192B)<br>448 (64B) | -64 |

FIG. 6

Pseudo code B

```
getNewAddress_bit8-9( Base_Address, Compression_Ratio)
{                                                                    700
        // shift right to make bit-8 rightmost bit
        Shift = Base_Address >>8;

// AND operation to zero-out all but original bit-9 and bit-8
        Parity = Shift & ...011;

if(Compression_Ratio != 4:4 OR (Parity == ...00 OR Parity == ...11))
        {
                //Use Parity to select a value from table of offsets corresponding to
                        compression and odd or even parity value
                //TableLookup may be function to retrieve a value from 2D array (e.g., FIG. 6)
                Offset = TableLookup[ Compression_Ratio ][ Parity ]

//return the base address offset by the
                return (Base_Address + Offset);
        }
        else
        {
                //the data of the base address will be split into two sections
                //TableLookup may be function to retrieve 2 values from 2D array (e.g., FIG. 6)
                Offsets[ ] = TableLookup[ 4:4 ][ Parity ];

//return the 2 offset base addresses
                return (Base_Address + Offsets[0]), (Base_Address + Offsets[1]);
        }
}
```

FIG. 7A

Example application of Pseudo code B (FIG. 7A)

//Use *Base_Address* = base physical address of a data segment
*Base_Address* = ...100000000;

//use 4:4 compression ratio
*Compression_Ratio* = 4:4;

//call pseudo code function to get the new physical address
*new_address* = getNewAddress_bit8-9( ...100000000, 4:4);

Pseudo code B getNewAddress_bit8-9( *Base_Address, Compression_Ratio*)           760
{
    // shift right to make bit-8 rightmost bit
    *Shift* = *Base_Address* >>7 = ...100000000 >> 8 = ...000000010;

// AND operation to zero-out all but original bit-9 and bit-8
    *Parity* = *Shift* & ...011 = ...000000010 & ...011 = ...10;

if(*Compression_Ratio* != 4:4 OR (*Parity* == ...00 OR *Parity* == ...11))
    {
        //Not applicable, as:
        1) *Compression_Ratio* == 4:4
            AND
        2) *Parity* == ...10
    }
    else
    {
        //the data of the base address will be split into two sections
        //TableLookup may be function to retrieve 2 values from 2D array (e.g., FIG. 6)
        *Offsets*[ ] = TableLookup[ 4:4 ][ *Parity* ] = TableLookup[4:4][...10] = [0 B, 448 B];

//return the 2 offset base addresses
        return (*Base_Address* + *Offsets*[0]), (*Base_Address* + *Offsets*[1]) =
            (...100000000 + 0 Bytes), ( ...100000000 + 448 Bytes);
    }
}

FIG. 7C

CACHE LINE COMPACTION OF COMPRESSED DATA SEGMENTS

RELATED APPLICATIONS

This application is a continuation of U.S. patent application Ser. No. 14/451,639 entitled "Cache Line Compaction of Compressed Data Segment" filed Aug. 5, 2014, the entire contents of all of which are hereby incorporated by reference for all purposes.

BACKGROUND

Lossless compression techniques may compress data segments of configurable sizes to smaller sizes. For example, a lossless compression algorithm may utilize different compression ratios (e.g., 4:1, 4:2, 4:3, 4:4) to compress 256-Byte data segments into compressed data segments of various sizes (e.g., 64 Bytes, 128 Bytes, 192 Bytes, 256 Bytes). Conventional techniques may process a data segment (or data block) to reduce the data segment to a fraction of its original size, helping to reduce the amount of bandwidth and resources consumed during data reads/writes between memory units.

Such compressed data may be stored in cache lines of a cache (e.g., an L3 cache). Typically, compressed forms of data segments (or compressed data segments) are stored within cache lines corresponding to the physical addresses of the uncompressed forms of the data segments (or source data segments). Each cache line may have a set size (e.g., 128 Bytes) or capacity that must be filled with any load operation, regardless of the size of the required data. For example, when loading a 64-Byte or 192-Byte segment into 128-Byte (B) cache lines, a computing device may be required to read and store in the cache line an additional, potentially unneeded 64 Bytes to completely fill the 128 Bytes of the cache line(s). Therefore, when compressed data to be loaded into a cache line (or multiple cache lines) is not the same size as source data segments (or the cache lines), there may be "holes" in the physical address space that do not contain useful data. This undesirable loading of unneeded, unusable data is referred to as "overfetching" and may cause suboptimal resource and bandwidth usage between memory units (e.g., Double Data Rate (DDR) random access memory (RAM), etc.) and caches. For example, holes can use up partial cache lines, both increasing requested memory bandwidth and wasting space in the cache that causes unevenness in resource use in computing devices. As compression schemes (e.g., Burrows-Wheeler transforms, etc.) may result in many compressed data segments that are smaller than cache lines, significant overfetching may occur, causing great inefficiency and increased workload that may diminish the benefits of using compression techniques. Further, compressed block sizes may be less than optimal DDR minimum access length (MAL), causing worse performance.

SUMMARY

Various aspects provide methods, devices, and non-transitory process-readable storage media for compacting data within cache lines of a cache of a computing device. An aspect method may identifying a base address for a first data segment, identifying a data size for the first data segment, obtaining a base offset based on the identified data size and the base address of the first data segment, and calculating an offset address by offsetting the base address with the obtained base offset, in which the calculated offset address may be associated with a second data segment.

In some aspects, obtaining the base offset based on the identified data size and the base address of the first data segment may be performed by one of the processor of the computing device executing software or a dedicated circuit coupled to the processor of the computing device, and calculating the offset address by offsetting the base address with the obtained base offset may be performed by one of the processor of the computing device executing software or the dedicated circuit coupled to the processor of the computing device.

In some aspects, the base address may be a physical address or a virtual address. In some aspects, the identified data size may be identified based on a compression ratio associated with the first data segment. In some aspects, the compression ratio may be one of a 4:1 compression ratio, a 4:2 compression ratio, a 4:3 compression ratio, or a 4:4 compression ratio.

In some aspects, obtaining the base offset based on the identified compression ratio and the base address of the first data segment may include identifying a parity value for the first data segment based on the base address, and obtaining the base offset using the identified compression ratio and the identified parity value.

In some aspects, obtaining the base offset using the identified compression ratio and the identified parity value may include obtaining the base offset by performing a lookup on a stored table using the identified compression ratio and the identified parity value. In some aspects, the parity value indicates whether a bit in the base address of the first data segment may be odd or even. In some aspects, the parity value may be based on two bits in the base address of the first data segment.

In some aspects, obtaining the base offset based on the identified data size and the base address of the first data segment may include obtaining a first base offset and a second base offset and a first data size and a second data size for the first data segment, and calculating the offset address by offsetting the base address with the obtained base offset may include calculating a first offset address for the first data size and a second offset address for the second data size.

In some aspects, the method may further include storing the first data segment at the calculated offset address, which may include reading the first data segment at the base address as uncompressed data, compressing the first data segment at the identified data size, and storing the compressed first data segment at the calculated offset address.

In some aspects, calculating the offset address by offsetting the base address with the obtained base offset may be accomplished after the first data segment has been compressed. In some aspects, the method may further include reading the first data segment at the calculated offset address.

In some aspects, the method may further include determining whether the second data segment has a correct compression ratio to be contiguous with the first data segment, and reading the first data segment at the calculated offset address may include prefetching the second data segment with the first data segment in response to determining the second data segment has the correct compression ratio. In some aspects, the method may further include decompressing the read first data segment.

Various aspects may include a computing device configured with processor-executable instructions to perform operations of the methods described above. Various aspects may include a computing device having means for performing functions of the operations of the methods described above. Various aspects may include non-transitory processor-readable media on which are stored processor-executable instructions configured to cause a processor of a computing device to perform operations of the methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

FIG. 4A is exemplary pseudo code of a function for returning new addresses (e.g., physical addresses) suitable for use in various aspects.

FIG. 4B is exemplary pseudo code for invoking the exemplary function of FIG. 4A suitable for use in various aspects.

FIG. 4C is exemplary pseudo code illustrating exemplary values used during an implementation of the exemplary function of FIG. 4A suitable for use in various aspects.

FIG. 6 is a data structure diagram illustrating a data table including base offset values corresponding to compression ratios and base address parity values corresponding to two bits of addresses suitable for use in various aspects.

FIG. 7A is another exemplary pseudo code of a function for returning new addresses (e.g., physical addresses) suitable for use in various aspects.

FIG. 7B is another exemplary pseudo code for invoking the exemplary function of FIG. 7A suitable for use in various aspects.

FIG. 7C is another exemplary pseudo code illustrating exemplary values used during an implementation of the exemplary function of FIG. 7A suitable for use in various aspects.

DETAILED DESCRIPTION

Figure 1:
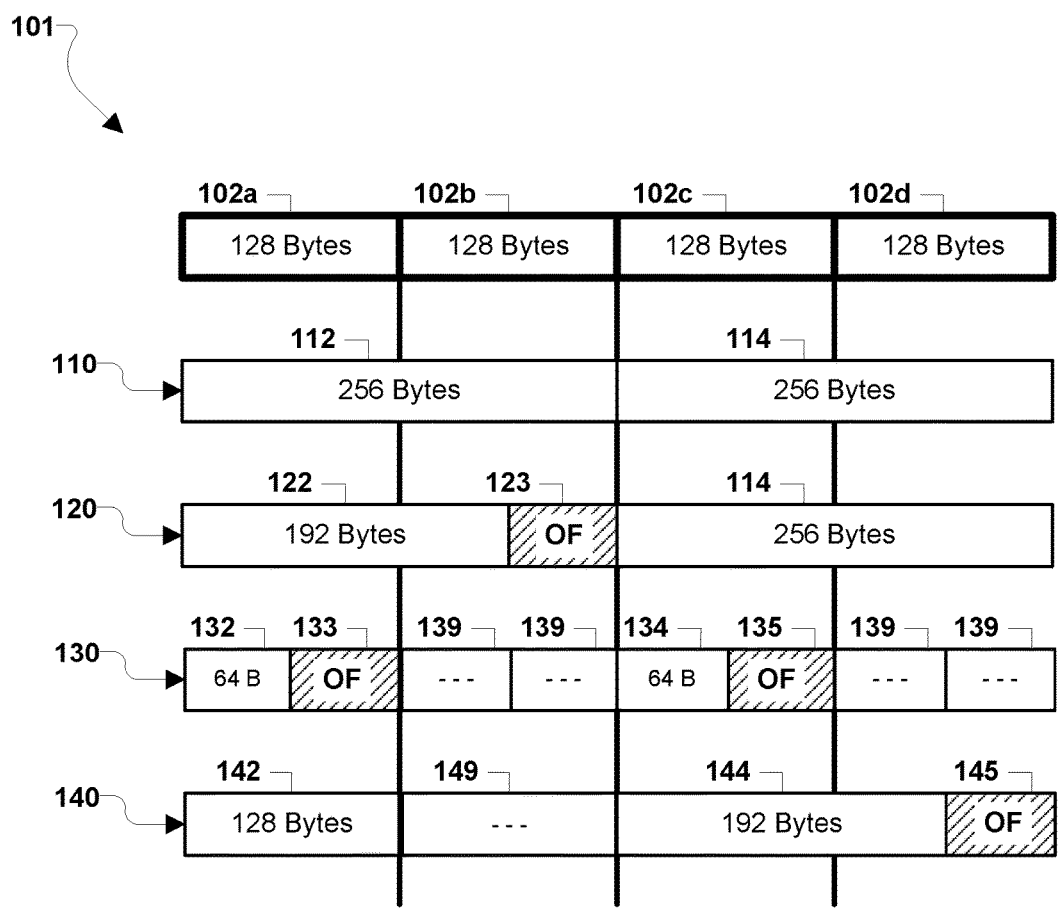
FIG. 1 is a memory structure diagram of exemplary placements of compressed data segments in cache lines known in the art.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

Various aspects include methods that may be implemented in computing devices to improve the compactness of compressed data segments in cache memory by compacting data segments within a cache so that the data segments overlap on cache lines. By overlapping data on cache lines, small compressed data segments may share cache lines, enabling more efficient memory accesses and less frequent unneeded overfetching.

The term "computing device" is used herein to refer to any one or all of cellular telephones, smartphones, webpads, tablet computers, Internet enabled cellular telephones, WiFi enabled electronic devices, personal data assistants (PDA's), laptop computers, desktop computers (or personal computers), servers, and similar electronic devices equipped with at least a processor. Computing devices may utilize various architectures to enable the performance of software instructions via their processor(s), and may include one or more memory units, such as random access memory units (e.g., DDR RAM, etc.) and cache units (e.g., L2 cache, L3 cache, etc.).

The term "source data segment" is used herein to refer to an uncompressed data segment that may be stored in a memory or cache unit of a computing device. In various aspects, a source data segment may be 256 Bytes in size. Further, a source data segment may be associated with an exclusive range of the physical address space that may be stored in a cache, the exclusive range being the same size as the source data segment (e.g., the size of an uncompressed tile or data block). For example, an exclusive range of a source data segment may be 256 Bytes. Source data segments may be stored in more than one cache line, and thus their exclusive ranges may extend to cover (or partially cover) multiple cache lines. The term "base address" is used herein to refer to a physical address or a virtual address that represents the start of a source data segment's exclusive range in the cache. The term "offset address" is used herein to refer to a physical address or a virtual address that is an offset of a base address (physical or virtual).

The term "compressed data segment" is used herein to refer to a data segment that has been reduced in size by a computing device executing a conventional data compression algorithm. Compressed data segments may be smaller in size (e.g., Bytes) than their respective source data segments. For example, a compressed data segment may be 64 Bytes whereas its corresponding source data segment may be 256 Bytes.

Compression techniques are often used to improve performance of computing devices by reducing the amount of data that is transferred between memory units and cache units. However, regardless of their smaller size, compressed data segments may still be associated with and aligned to particular addresses (e.g., physical addresses) of the cache, often causing suboptimal use of cache lines. For example, when using 128-Byte cache lines and compressing 256-Byte data segments to 64-Byte (i.e., using a 4:1 compression ratio) or 192-Byte (i.e., using a 4:3 compression ratio) compressed data segments, 64 Bytes of the cache line may be wasted due to overfetch. With compressed data segments of a minimum compression size (e.g., 64 Bytes) that is smaller than cache line size (e.g., 128 Bytes), data loads to the cache via conventional techniques include wasted data that increases bandwidth and makes compression worse. For example, compressed data segments of size 64 Bytes and 192 Bytes may comprise a significant portion of cache transactions for some workloads (e.g., user interface (UI) workloads), and thus may lead to inefficient use of the cache space as well as unnecessary overfetching. In many cases, conventional techniques for placing compressed data within cache lines, such as during scenarios involving compression on UI workloads, may be especially inefficient when handling data segments compressed with 4:1 or 4:3 compression ratios.

Figure 2:
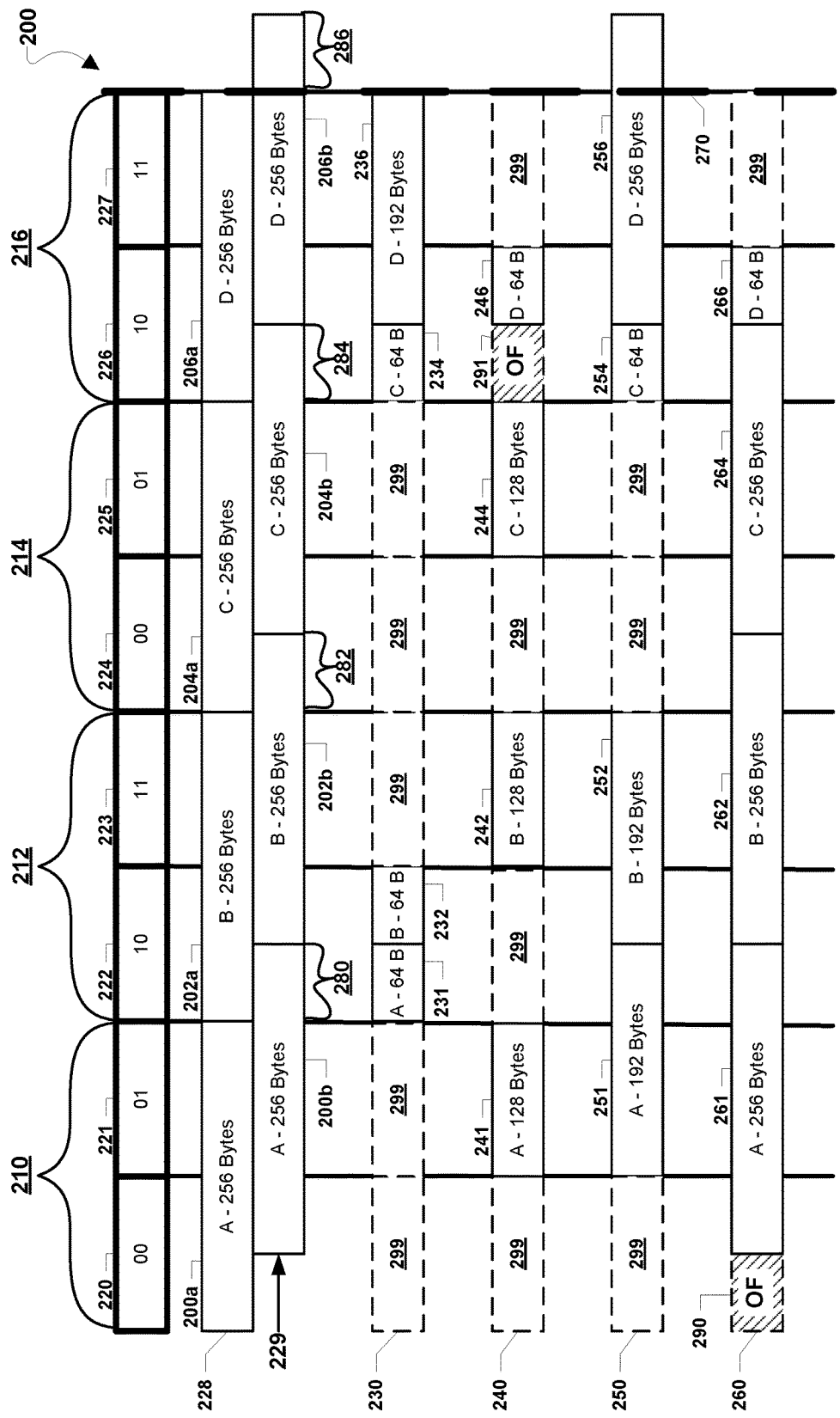
FIG. 2 is a memory structure diagram illustrating offset placements in cache lines of data segments according to aspect compaction techniques.

FIG. 2 further emphasize the potential inefficiency of conventional techniques, FIG. 1 shows a diagram 101 illustrating problematic placements of compressed data segments in cache lines of a computing device implementing such conventional compression techniques known in the art. An exemplary cache may include cache lines 102a-102d that are consecutively aligned and that each have a fixed size, such as 128 Bytes. A first line 110 of the diagram 101 illustrates a first source data segment 112 (or tile or data block) and a second source data segment 114 that may be stored in the cache. The first source data segment 112 may correspond to the first cache line 102a and the second cache line 102b (i.e., the first source data segment 112 may be stored in both cache lines 102a-102b). Similarly the second data segment 114 may correspond to the third cache line 102c and the fourth cache line 102d (i.e., the second source data segment 114 may be stored in both cache lines 102c-102d).

The computing device, configured to perform various conventional compression algorithms, may be capable of compressing the source data segments 112, 114 with different compression ratios, such as a 4:1 compression ratio (e.g., compressing a 256-Byte data segment to a 64-Byte data segment), a 4:2 compression ratio (e.g., compressing a 256-Byte data segment to a 128-Byte data segment), a 4:3 compression ratio (e.g., compressing a 256-Byte data segment to a 192-Byte data segment), and a 4:4 compression ratio (e.g., compressing a 256-Byte data segment to a 256-Byte data segment or no compression).

For example, a second line 120 of the diagram 101 illustrates a first compression of the source data segments 112, 114. In particular, the first source data segment 112 may be compressed by the computing device to a first compressed data segment 122 that is 192 Bytes in size (i.e., using a 4:3 compression ratio). The first compressed data segment 122 may remain in alignment with the first source data segment 112 (i.e., the beginning of the first compressed data segment 122 may be stored with no offset in the first cache line 102a). In the second line 120, regarding the second source data segment 114, the computing device may use a 4:4 compression ratio (or not be compressed), and thus the second source data segment 114 may still be 256 Bytes in size. Source data segments may be selectively compressed, such as when a compression algorithm used by the computing device is not configured to be capable of compressing a particular, data segment or the computing device is otherwise configured to not choose to compress a data segment.

The first compressed data segment 122 may still correspond (or be aligned) with the first cache line 102a and the second cache line 102b, however due to its smaller size (i.e., less than the original 256 Bytes), the first compressed data segment 122 may only utilize part (or half) of the second cache line 102b. In other words, the 192-Byte first compressed data segment 122 may cause the 128-Byte first cache line 102a to be fully used and the 128-Byte second cache line 102b to only be half used. As a result of the half use of the second cache line 102b, a first 64-Byte overfetch data segment 123 of unused data (referred to in FIG. 1 as "OF") may also be present in the second cache line 102b. For example, the first overfetch section 123 may be loaded in the second cache line 102b when reading the first compressed data segment 122 in from DDR or other memory.

As another example, a third line 130 of the diagram 101 illustrates a second compression of the source data segments 112, 114. In particular, the first source data segment 112 may be compressed by the computing device to a second compressed data segment 132 that is 64 Bytes in size (i.e., using a 4:1 compression ratio). The second compressed data segment 132 may remain in alignment with the first source data segment 112 (i.e., the beginning of the second compressed data segment 132 may be stored with no offset in the first cache line 102a). The second compressed data segment 132 may not utilize the second cache line 102b, and thus the second cache line 102b may be filled with two 64-Byte unused data segments 139 (e.g., invalid, null, or otherwise unused data segments). Alternatively, the second cache line 102b may be filled with one 128-Byte invalid data segment. Due to the 64-Byte second compressed data segment 132 only filling half the 128-Byte first cache line 102a, a second 64-Byte overfetch data segment 133 of overfetch/unused data may also be present in the first cache line 102a.

Similar to the second compressed data segment 132 in the third line 130, the second source data segment 114 may be compressed by the computing device to a third compressed data segment 134 that is 64 Bytes in size (i.e., using a 4:1 compression ratio). The third compressed data segment 134 may remain in alignment with the second source data segment 114 (i.e., the beginning of the third compressed data segment 134 may be stored with no offset in the third cache line 102c). The third compressed data segment 134 may not utilize the fourth cache line 102d, and thus the fourth cache line 102d may be filled with two 64-Byte unused data segments 139 (or alternatively one 128-Byte unused data segment). However, due to the 64-Byte third compressed data segment 134 only filling half the 128-Byte third cache line 102c, a third 64-Byte overfetch data segment 135 of overfetch/unused data may also be present in the third cache line 102c.

As another example, a fourth line 140 of the diagram 101 illustrates a third compression of the source data segments 112, 114. In particular, the first source data segment 112 may be compressed by the computing device to a fourth compressed data segment 142 that is 128 Bytes in size (i.e., using a 4:2 compression ratio). The fourth compressed data segment 142 may remain in alignment with the first source data segment 112 (i.e., the beginning of the fourth compressed data segment 142 may be stored with no offset in the first cache line 102a). The fourth compressed data segment 142 may not utilize the second cache line 102b, and thus the second cache line 102b may be filled with a 128-Byte unused data segment 149 (or alternatively two 64-Byte unused data segments).

The second source data segment 114 may be compressed by the computing device to a fifth compressed data segment 144 that is 192 Bytes in size (i.e., using a 4:3 compression ratio). The fifth compressed data segment 144 may remain in alignment with the second source data segment 114 (i.e., the beginning of the fifth compressed data segment 144 may be stored with no offset in the third cache line 102c). The fifth compressed data segment 144 may only partially utilize the fourth cache line 102*d*, and thus the fourth cache line 102*d* may be filled with a fourth 64-Byte overfetch data segment 145.

To improve upon the inefficient placement of compressed data segments of conventional techniques illustrated in FIG. 1, various aspects include methods, devices, and non-transitory process-readable storage media for compacting data segments within a cache so that the data segments overlap on cache lines. In other words, a data segment may be placed within an address range (e.g., physical address range) of a cache typically associated with other another data segment instead of within its own normal address range, resulting in a more efficient use of cache lines (i.e., fewer cache lines are required to store the same amount of data). With such overlapping, small compressed data segments may share cache lines, enabling more efficient memory accesses (e.g., DDR MAL) and less frequent unneeded overfetching.

In various aspects, a computing device may be configured to perform cache line compacting operations that shift (or offset) the placement of a data segment into an exclusive range (or address space) of the cache typically associated with another data segment. For example, the computing device may shift two contiguous exclusive ranges so that they extend into each half of a single cache line. To achieve such compaction, the computing device may identify a base offset to be applied to the base address of a first data segment (or data block) in order to store the first data segment within a cache line (e.g., within a physical address) typically associated with a second data segment. A base offset may be determined by the computing device based on at least a data size of the data segment. Such a data size may be identified based on a compression ratio of the data segment (i.e., a ratio of an uncompressed size to a compressed size). For example, a base offset for a data segment may be a first amount (in Bytes) from a base address when the data segment is compressed at a first compression ratio (e.g., 4:4) and a second amount when the data segment is compressed at a second compression ratio (e.g., 4:1). Such compression ratios may be identified by the computing device based on the various compression algorithms utilized by the computing device to compress the data segments.

In addition to data sizes (e.g., compression ratios), base offsets may be determined by the computing device based on base addresses themselves. For example, a data segment compressed at a certain compression level (e.g., 4:1) may have a first offset (e.g., 64 Bytes) when a certain bit (e.g., bit-8) of its base address is odd (i.e., a '1') and a second offset (e.g., 256 Bytes) when the certain bit is even (i.e., a '0'). In some aspects, the value of a bit-8 of a base address may change with each 256 Bytes in base addresses. For example, for a first address in a cache, the bit-8 may be a '0' value, but for a second address 256 Bytes apart from the first address, the bit-8 value may be a '1' value.

In some aspects, base offsets for compressed data segments may be less than a 4 KB page size. Thus, the computing device may perform aspect compaction operations or techniques for any virtual address or physical address of various memory or cache units.

In some aspects, the computing device may perform a look-up on a predefined data table using a compression ratio and information about the base address (e.g., physical address in cache) of a data segment to identify a corresponding base offset. However, instead of utilizing predetermined data tables, in some aspects, the computing device may identify offset values for compacting data segments within the cache using logic, software, circuits, and other functionalities. For example, the computing device may identify offset values and calculate offset addresses via the processor of the computing device executing software (e.g., operations to access a stored data table, etc.) and/or via a dedicated circuit coupled to the processor of the computing device.

In some aspects, the computing device may shift all exclusive ranges by half a cache line (equal to the smallest compression size) from the base addresses. In this way, compressed data segments that do not fill a cache line can be offset into the cache line that is shared with the exclusive range of another source data segment, enabling opportunistic use of a whole cache line (i.e., consecutive compressions can be mapped to the shared cache line).

Aspect techniques may be utilized by the computing device to compact data segments independently of other data segments within a buffer. For example, regardless of the compression ratio used for a neighboring data segment, a particular data segment may be offset within cache lines based only on its own compression ratio and base address. In other words, in order to compact a data segment, the computing device may not be required to be aware of the compression ratios and/or offsets of other data segments.

The following is an example application of an aspect method by a computing device. The computing device may be configured to perform a read from a memory unit (e.g., DDR) to retrieve an uncompressed data segment (i.e., a source data segment). The uncompressed, retrieved data segment may typically be associated with a base address (e.g., a physical address) in a cache. The computing device may evaluate the retrieved data segment to identify the level of compression (or ratio) that may be applied via a compression algorithm. The identified compression ratio may be the maximum that is possible for the data segment in order to maximize cache space usage. The computing device may compress the data segment at that compression ratio. Based on the compression ratio and the base address the uncompressed data segment is associated with, the computing device may identify an offset within the cache to store the compressed data segment, such as an offset 64 Bytes from the base address. The computing device may then load the compressed data segment in the offset address.

The various aspects may be beneficial in reducing unnecessary bandwidth use related to overfetching in various types of computing devices for which improvements in power and/or memory bandwidth (e.g., DDR) usage is desirable. For example, aspect operations may be utilized by mobile devices (e.g., smartphones) that utilize system-on-chips. Further, the various aspects may be beneficial by enabling prefetching for use in an L3 cache or other similar memory or storage unit to improve performance of computing devices. In particular, a data segment and an adjacent data segment (or neighboring segment) stored in a shared cache line may be fetched at the same time, thereby reducing reads. For example, the computing device may retrieve a first compressed data segment of a 64-Byte size along with an adjacent second compressed data segment of the 64-Byte size.

The aspect cache line compaction operations described herein may be performed by the computing device to reduce overfetch for various workloads, including UI workloads. The aspect operations may be particularly beneficial in reducing overfetch for workloads that include data segments compressed at 4:1 and 4:3 compression ratios that occur in contiguous blocks as well as data segments compressed at 4:1 or 4:2 compression ratios.

Conventional techniques include operations for configuring caches to support compressed and non-compressed lines as well as operations for determining whether to compress data. For example, conventional techniques may include methods for compressing two non-compressed lines that are adjacent into a single element due merely to the typical effect of compression operations (e.g., adjacent lines sequential in physical address space may be compressed to fit in one line due to a compression operation).

Unlike conventional techniques, the various aspects do not simply address compression or storing compressed data in caches. Instead, the aspect techniques provide functionalities that may be used to change such conventional compression techniques so that conventionally compressed data may be better positioned within cache lines. In other words, the aspect techniques may be utilized by computing devices in a processing phase after compressing data, such that post-compression outputs (i.e., already compressed data segments) that conventionally would be placed in different cache lines are packed into the cache in a more efficient manner. For example, a computing device performing aspect operations may take two different compressed data segments that would have been loaded into two different, partially-used cache lines and store the two compressed data segments into a single cache line by using offset shifting. In other words, the aspects feature shifting already compressed data segments within the address space (e.g., physical address space) of a cache, changing the base address of compressed data segments to improve cache usage.

For simplicity, the descriptions of various aspects may refer to operations that compact compressed data segments within caches. However, the various aspect operations may be applied by a computing device to compact any type of data (e.g., compressed or uncompressed) within any storage unit or architecture (e.g., SRAM, caches, etc.). In other words, the various aspects are not intended to be limited to use with data compression schemes. For example, a computing device may perform aspect methods described herein to improve compaction of any data set that includes data segments of variable length or any data set with holes (e.g., unused data segments) in a buffer. Although base addresses may be referred to as physical addresses herein, it should be appreciated that in some aspects, base addresses may be virtual addresses.

In various aspects, the computing device may utilize cache lines (and thus data associated or stored within the cache lines) that are contiguous (i.e., neighboring storage). However, in some aspects the computing device may be configured to store/access data segments within non-contiguous addresses within a cache. In other words, aspect techniques may enable the compaction of data segments stored in cache lines that may or may not be in different places in memory.

For simplicity, computing devices performing various aspect methods may be referred to as identifying or otherwise using compression ratios associated with data segments in order to calculate offset addresses. However, it should be appreciated that computing devices performing such aspects may identify or otherwise use any form of indication of the data size of such data segments in order to compact the data segments according to various aspects. In other words, the various aspects may be used to perform compaction on data segments that may or may not be compressed. Computing devices performing various aspect techniques may be capable of identifying data sizes of data segments based on various compression ratios and data size distributions, and therefore compression ratios examples referred to in the descriptions of various aspects are not intended to limit the scope of the claims to 4:1, 4:2, 4:3, 4:4 compression ratios.

FIG. 2 illustrates placements of data segments within cache lines 220-227 according to aspect cache line compaction operations performed by a computing device. The computing device may be configured to utilize a conventional compression algorithm to compress the various data segments. In particular, FIG. 2 illustrates an example in which the computing device may use a compression algorithm to compress 256-Byte source data segments 200a-206a into compressed segments that are 64 Bytes via a 4:1 compression ratio, 128 Bytes via a 4:2 compression ratio, 192 Bytes via a 4:3 compression ratio, or 256 bytes via a 4:4 compression ratio. For clarity of the following descriptions of FIG. 2, cache line mappings are shown with vertical lines to indicate the fixed size (e.g., 128 Bytes) of the consecutively aligned cache lines 220-227, and a dotted line 270 may indicate a 1-kB interleave.

The cache lines 220-227 may be associated with physical addresses that may increase from left to right (i.e., the physical address of the first cache line 220 is a number less than the number associated with the physical address of the second cache line 221, etc.). In some aspects, the physical addresses of the cache lines 220-227 may be represented by at least 8 bits. FIG. 2 shows indications of the eighth and seventh bits of the associated physical addresses of the various cache lines 220-227. For example, the eighth bit (or bit-8) of the first cache line 220 may be a '0' value and the seventh bit (or bit-7) of the first cache line 220 may be a '0' value, the eighth bit (or bit-8) of the second cache line 221 may be a '0' value and the seventh bit (or bit-7) of the second cache line 221 may be a '1' value, the eighth bit (or bit-8) of the third cache line 222 may be a '1' value and the seventh bit (or bit-7) of the third cache line 222 may be a '0' value, etc.

A first line 228 of the diagram 200 illustrates default placements of uncompressed, source data segments 200a-206a within 256-Byte segment boundaries 210-216 when stored in the cache according to typical techniques. In other words, source data segments 200a-206a may be stored within their base addresses at 256-Byte intervals. In particular, a first source data segment 200a (referred to as 'A' in FIG. 2) may be placed with no offset within the first cache line 220 and the second cache line 221. A second source data segment 202a (referred to as 'B' in FIG. 2) may be placed with no offset within the third cache line 222 and the fourth cache line 223. A third source data segment 204a (referred to as 'C' in FIG. 2) may be placed with no offset within the fifth cache line 224 and the sixth cache line 225. A fourth source data segment 206a (referred to as 'D' in FIG. 2) may be placed with no offset within the seventh cache line 226 and the eighth cache line 227. The segment boundaries 210-216 may correspond with the exclusive ranges for each of the source data segments 200a-206a within the segment boundaries 210-216.

Line 229 of the diagram 200 illustrates offset source data segments 200b-206b corresponding to offset exclusive ranges for mapping compressed forms of the source data segments 200a-206a. Lines 230, 240, 250, 260 of the diagram 200 illustrate offset placements of compressed forms of the source data segments 200a-206a within the offset exclusive ranges that overlap the base addresses in accordance with aspect techniques. In some aspects, the base offsets used by the computing device to place the various compressed data segments as described below may be based on look-ups performed on a predefined data table, such as described below with reference to FIG. 3.

A second line 229 of the diagram 200 illustrates a simple offset mapping for compressed data segments to offset exclusive ranges corresponding to offset data segments 200b-206b within a 64-Byte base offset from their respective base addresses. Such a mapping may require that an additional 64 Bytes be allocated at the end of all compressed data buffers using this aspect. A first offset data segment 200b corresponding to the first source data segment 200a (i.e., 'A') may be mapped by the computing device with a 64-Byte offset to be within half of the first cache line 220, the entire second cache line 221, and half of the third cache line 222. The first offset data segment 200b may overlap into the third cache line 222 by a 64-Byte overlap 280. A second offset data segment 202b corresponding to the second source data segment 202a (i.e., 'B') may be mapped by the computing device with a 64-Byte offset to be within half of the third cache line 222, the entire fourth cache line 223, and half of the fifth cache line 224. The second offset data segment 202b may overlap into the fifth cache line 224 by a 64-Byte overlap 282. A third offset data segment 204b corresponding to the third source data segment 204a (i.e., 'C') may be mapped by the computing device with a 64-Byte offset to be within half of the fifth cache line 224, the entire sixth cache line 225, and half of the seventh cache line 226. The third offset data segment 204b may overlap into the seventh cache line 226 by a 64-Byte overlap 284. A fourth offset data segment 206b corresponding to the fourth source data segment 206a (i.e., 'D') may be mapped by the computing device with a 64-Byte offset to be within half of the seventh cache line 226, the entire eighth cache line 227, and half of another cache line (not shown). The fourth offset data segment 206b may cross the interleave and may overlap into the another cache line (not shown) by a 64-Byte overlap 286. The offset data segments 200b-206b may be compressed by the computing device at a 4:4 compression ratio, or alternatively not compressed but only shifted via base offsets.

A third line 230 of the diagram 200 illustrates offset placement of 64-Byte data segments compressed at a 4:1 compression ratio by the computing device. In particular, a first 64-Byte compressed data segment 231 corresponding to the first source data segment 200a (i.e., 'A') may be placed by the computing device at a 256-Byte offset to be within half of the third cache line 222, and within the offset exclusive range corresponding to the first offset data segment 200b. A second 64-Byte compressed data segment 232 corresponding to the second source data segment 202a (i.e., 'B') may be placed by the computing device at a 64-Byte offset to be within the other half of the third cache line 222, and within the offset exclusive range corresponding to the second offset data segment 202b. In other words, the first and second 64-Byte compressed data segments 231, 232 may share the third cache line 222 despite that cache line 222 being typically associated with only the second source data segment 202a (i.e., 'B'), and within the exclusive range corresponding to only the second source data segment 202a. Due to the 256-Byte and 64-Byte offset placements of the first and second 64-Byte compressed data segments 231, 232, respectively, the first cache line 220, second cache line 221, and fourth cache line 223 may include unused data 299. In other words, the computing device may not have been required to fetch any data for these cache lines 220, 221, 223. Such unused cache lines (i.e., the cache lines 220, 221, 223 associated with unused data 299) may be free for the cache to allocate to other requests.

Also referring to the third line 230 of the diagram 200, a third 64-Byte compressed data segment 234 corresponding to the third source data segment 204a (i.e., 'C') may be placed by the computing device at a 256-Byte offset to be within half of the seventh cache line 226, and within the offset exclusive range corresponding to the third offset data segment 204b. A 192-Byte compressed data segment 236 corresponding to the fourth source data segment 206a (i.e., 'D') may be placed by the computing device at a 64-Byte offset within the other half of the seventh cache line 226 and the entire eighth cache line 227, and within the offset exclusive range corresponding to the fourth offset data segment 206b. The 192-Byte compressed data segment 236 may have been compressed by the computing device at a 4:3 compression ratio. The third 64-Byte compressed data segment 234 and the 192-Byte compressed data segment 236 may share the seventh cache line 226 despite that cache line 226 being typically associated with only the fourth source data segment 206a (i.e., 'D'), and within the exclusive range corresponding to only the fourth source data segment 206a. Due to the 256-Byte and 64-Byte offset placements of the third 64-Byte compressed data segment 234 and 192-Byte compressed data segment 236, respectively, the fifth cache line 224 and the sixth cache line 225 may include unused data 299.

A fourth line 240 of the diagram 200 illustrates offset placement of 128-Byte data segments compressed at a 4:2 compression ratio by the computing device. In particular, a first 128-Byte compressed data segment 241 corresponding to the first source data segment 200a (i.e., 'A') may be placed by the computing device at a 128-Byte offset to be within the second cache line 221, and within the offset exclusive range corresponding to the first offset data segment 200b. A second 128-Byte compressed data segment 242 corresponding to the second source data segment 202a (i.e., 'B') may be placed by the computing device at a 128-Byte offset to be within the fourth cache line 223, and within the offset exclusive range corresponding to the second offset data segment 202b. In this way, the first and second 128-Byte compressed data segments 241, 242 may still be stored within their typical segment boundaries 210, 212 corresponding to their exclusive ranges, but may be offset such that the first cache line 220 and the third cache line 222 include unused data 299. In other words, due to the 128-Byte offsets, the computing device may not have been required to fetch any data for these cache lines 220, 223.

Also referring to the fourth line 240 of the diagram 200, a third 128-Byte compressed data segment 244 corresponding to the third source data segment 200c (i.e., 'C') may be placed by the computing device at a 128-Byte offset within the sixth cache line 225, and within the offset exclusive range corresponding to the third offset data segment 204b. A 64-Byte compressed data segment 246 corresponding to the fourth source data segment 206a (i.e., 'D') may be placed by the computing device at a 64-Byte offset to be within the seventh cache line 226, and within the offset exclusive range corresponding to the fourth offset data segment 206b. In this way, the third 128-Byte compressed data segment 244 and the 64-Byte compressed data segment 246 may still be stored within their typical segment boundaries 214, 216 corresponding to their exclusive ranges, but may be offset such that the fifth cache line 224 and the eighth cache line 227 include unused data 299. However, due to the 64-Byte compressed data segment 246 not completely filling the seventh cache line 226 and the third 128-Byte compressed data segment 244 not being offset into the fourth segment boundary 216, the seventh cache line 226 may be half-filled with overfetch data 291.

A fifth line 250 of the diagram 200 illustrates offset placement of 192-Byte data segments compressed at a 4:3 compression ratio by the computing device. In particular, a first 192-Byte compressed data segment 251 corresponding to the first source data segment 200a (i.e., 'A') may be placed by the computing device at a 128-Byte offset to be within the second cache line 221 and half of the third cache line 222, and within the offset exclusive range corresponding to the first offset data segment 200b. A second 192-Byte compressed data segment 252 corresponding to the second source data segment 202a (i.e., 'B') may be placed by the computing device at a 64-Byte offset to be within half of the third cache line 222 and the fourth cache line 223, and within the offset exclusive range corresponding to the second offset data segment 202b. In this way, the first and second 192-Byte compressed data segments 251, 252 may be offset to share the third cache line 222, enabling the first cache line 220 to include unused data 299. In other words, due to the 192-Byte offsets, the computing device may not have been required to fetch any data for the first cache line 220.

Also referring to the fifth line 250 of the diagram 200, a 64-Byte compressed data segment 254 corresponding to the third source data segment 200c (i.e., 'C') may be placed by the computing device at a 256-Byte offset to be within the seventh cache line 226, and within the offset exclusive range corresponding to the third offset data segment 204b. A 256-Byte compressed data segment 256 corresponding to the fourth source data segment 206a (i.e., 'D') may be placed by the computing device at a 64-Byte offset to be within half the seventh cache line 226, the full eighth cache line 227, and half of another cache line (not shown), and within the offset exclusive range corresponding to the fourth offset data segment 206b. The 256-Byte compressed data segment 256 may have been compressed by the computing device at a 4:4 compression ratio. In this way, the fifth and sixth cache lines 224, 225 may include unused data 299. However, the 256-Byte compressed data segment 256 may cross the interleave 270 and thus the computing device may be required to use separate transactions.

A sixth line 260 of the diagram 200 illustrates offset placement of 256-Byte data segments compressed at a 4:4 compression ratio by the computing device. In particular, a first 256-Byte compressed data segment 261 corresponding to the first source data segment 200a (i.e., 'A') may be placed by the computing device at a 64-Byte offset to be within half of the first cache line 220, the entire second cache line 221, and half of the third cache line 222, and within the offset exclusive range corresponding to the first offset data segment 200b. A second 256-Byte compressed data segment 262 corresponding to the second source data segment 202a (i.e., 'B') may be placed by the computing device at a 64-Byte offset to be within half of the third cache line 222, the entire fourth cache line 223, and half of the fifth cache line 224, and within the offset exclusive range corresponding to the second offset data segment 202b. Further, a third 256-Byte compressed data segment 264 corresponding to the third source data segment 200c (i.e., 'C') may be placed by the computing device at a 64-Byte offset to be within half of the fifth cache line 224, the full sixth cache line 225, and half of the seventh cache line 226, and within the offset exclusive range corresponding to the third offset data segment 204b. A 64-Byte compressed data segment 266 corresponding to the fourth source data segment 206a (i.e., 'D') may be placed by the computing device at a 64-Byte offset to be within half the seventh cache line 226, and within the offset exclusive range corresponding to the fourth offset data segment 206b. In this way, the eighth cache line 227 may include unused data 299. However, due to the first 256-Byte compressed data segment 261 not completely filling the first cache line 220, the first cache line 220 may be half-filled with overfetch data 290.

In some aspects, the computing device may split data segments into separate transactions across segment boundaries in order to mitigate when the data segments are mapped to cross the interleave and/or page boundaries. For example and as described above in FIG. 2, when the computing device places 256-Byte compressed data segments (e.g., segments compressed with a 4:4 compression ratio) over an interleave and/or page boundaries, two separate transactions may be required. In some aspects, the computing device may split data segments into separate transactions across segment boundaries in order to mitigate when the data segments are mapped to avoid crossing the interleave and/or page boundaries. For example and as described below in FIG. 5, when the computing device places 256-Byte compressed data segments (e.g., segments compressed with a 4:4 compression ratio) over a segment boundary, two separate transactions may be required.

Figure 3:
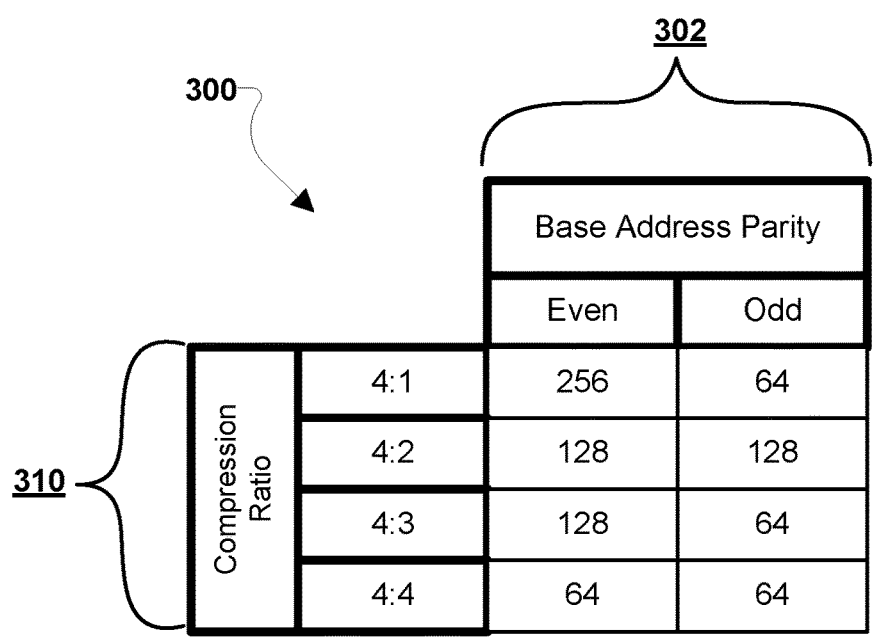
FIG. 3 is a data structure diagram illustrating a data table including base offset values corresponding to compression ratios and base address parity values suitable for use in some aspects.

FIG. 3 illustrates a data table 300 including offset values corresponding to compression ratios and base address information (i.e., base address parity values) suitable for use in some aspects. A computing device implementing aspect compacting techniques may perform lookups on the data table 300 using compression ratio information 310 and base address parity information 302 for a particular compressed data segment to identify the size of base offset that should be used to place (or access) the data segment within cache. Base address parity information 302 may be an indication of whether the bit-8 for the data segment's base address (e.g., physical address) in the cache is odd (i.e., a '1' value) or even (i.e., a '0' value). In some aspects, the data table 300 may be a two-dimensional (2D) array stored within memory of the computing device. In some aspects, both hardware and software may be utilized to implement the techniques, such as by the computing device utilizing a table or logic.

For example, in response to performing a lookup on the data table 300 for a data segment that is compressed at a 4:1 compression rate and has a base address with an even value bit-8, the computing device may identify a 256-Byte base offset. In response to performing a lookup on the data table 300 for a data segment that is compressed at a 4:1 compression rate and has a base address with an odd value bit-8, the computing device may identify a 64-Byte base offset. In response to performing a lookup on the data table 300 for a data segment that is compressed at a 4:2 compression rate and has a base address with an even or an odd value bit-8, the computing device may identify a 128-Byte base offset. In response to performing a lookup on the data table 300 for a data segment that is compressed at a 4:3 compression rate and has a base address with an even value bit-8, the computing device may identify a 128-Byte base offset. In response to performing a lookup on the data table 300 for a data segment that is compressed at a 4:3 compression rate and has a base address with an odd value bit-8, the computing device may identify a 64-Byte base offset. In response to performing a lookup on the data table 300 for a data segment that is compressed at a 4:4 compression rate and has a base address with an even or an odd value bit-8, the computing device may identify a 64-Byte base offset.

FIG. 4A illustrates exemplary pseudo code 400 of a function that may be executed by a computing device in order to identify new addresses (e.g., physical addresses) for offset placement of compressed data segments within a cache. For example, a computing device may be configured with instructions as described below in order to place data segments as illustrated in FIG. 2 above. The function illustrated by the pseudo code 400 may be executed by the computing device as part of an application, firmware, an application programming interface (API), a routine, and/or operations, such as during or after the execution of a compression routine (e.g., a compression routine on a data set). It should be appreciated that such pseudo code 400 is provided for general illustration purposes, and thus is not intended to represent any particular programming language, structure, or formatting.

The pseudo code 400 (referred to as "Pseudo code A" in FIG. 4A) may represent a function called "getNewAddress_oddOrEven( )" that may require a Base_Address input parameter and a Compression_Ratio input parameter related to a particular data segment. In some aspects, the Base_Address may be a binary representation of a physical address or a virtual address. The function shown in the pseudo code 400 may include instructions for the computing device to perform a shift right operation on the Base_Address input parameter in order to move a bit-8 of the data segment's base address to the rightmost bit for storage in a Shift variable (the shift right operation indicated in FIG. 4A as ">>8"). The function shown in the pseudo code 400 may include instructions for performing a bitwise AND operation (or '&' in FIG. 4A) on the bit-8 of the address (i.e., the Shift variable) and a '1' value (e.g., " . . . 000000001") that may generate a value stored in a Parity variable. In other words, the value in the Parity variable may be 0 when the Shift variable is 0 and the Parity variable value may be 1 when the Shift variable is 1.

The function shown in the pseudo code 400 may also include instructions for the computing device to use the Compression_Ratio input parameter and the calculated Parity variable to perform a lookup operation on a predefined table, such as described in FIG. 3. The retrieved value from the lookup may be stored in an Offset variable. In some aspects, the lookup operation may be an operation to access information in a two-dimensional (2D) array stored within memory of the computing device. Finally, the function shown in the pseudo code 400 may include an instruction for the computing device to add the Base_Address and the Offset variables to generate an offset address (e.g., a new offset physical address) that may be returned for use by the computing device to place the data segment.

In some aspects, the computing device may be configured with simplified logic, circuits, software instructions, and/or routines to generate new addresses instead of utilizing a table lookup operation as indicated with the pseudo code 400.

FIGS. 4B-4C illustrate exemplary pseudo code and values that may be used in an invocation of the function shown in the pseudo code 400 described in FIG. 4A. It should be appreciated the example values in FIGS. 4B-4C are for illustration purposes, and are not intended to limit the scope of the aspects.

FIG. 4B illustrates exemplary pseudo code 450 that may be performed by a computing device to invoke the exemplary function for determining a new offset address for a data segment as described above in FIG. 4A. The exemplary pseudo code 450 may include instructions for setting values for the Base_Address and Compression_Ratio variables that may be used as input parameters for a call to the getNewAddress_oddOrEven( ) function. For example, the Base_Address may be set as a physical address for a data segment (e.g., " . . . 100000000"), where the physical address includes at least eight bits. As another example, the Compression_Ratio variable may be set as a value (e.g., 4:4) that indicates the level of compression (or compression ratio) the computing device has compressed the data segment using a compression algorithm. The pseudo code 450 may include a call to the function getNewAddress_oddOrEven( ) using these input parameters and values, and may enable the computing device to store a return value from the function in a new_address variable, such as a new physical address for the data segment that enables an offset placement in a cache line.

FIG. 4C illustrates exemplary pseudo code 460 that is similar to the pseudo code 400 of FIG. 4A but that also includes exemplary values used in the various instructions based on the input parameter values described above in FIG. 4B. In other words, the pseudo code 460 is the functional equivalent of the exemplary pseudo code 400 of FIG. 4A with added indications of the values of calculations performed as part of the exemplary function getNewAddress_oddOrEven( ).

For example, in FIG. 4C, the function may utilize a Base_Address input parameter with a value of " . . . 100000000" and a Compression_Ratio input parameter with a value of "4:4". In response to performing a shift right operation on the Base_Address input parameter, the computing device may generate a value of " . . . 000000010" in order to move the bit-8 of the data segment's base address (e.g., physical address) to the rightmost bit for storage in a Shift variable. The function may include instructions for performing a bitwise AND operation on the Shift variable and a 1 value (or " . . . 000000001") that may generate a value stored in a Parity variable. For example, when the Shift variable has a value of "000000010", the bitwise AND operation may produce a Parity variable value of " . . . 000000000" (or simply 0). With the exemplary Parity variable value of 0 and the exemplary value of the Compression_Ratio 4:4, the results of a lookup on the predefined table described in FIG. 3 may return an Offset variable value of 64 Bytes. The function may then return a new offset address for the data segment that is the combination of the Offset variable value (e.g., 64 Bytes) and the Base_Address (e.g., " . . . 100000000).

Figure 5:
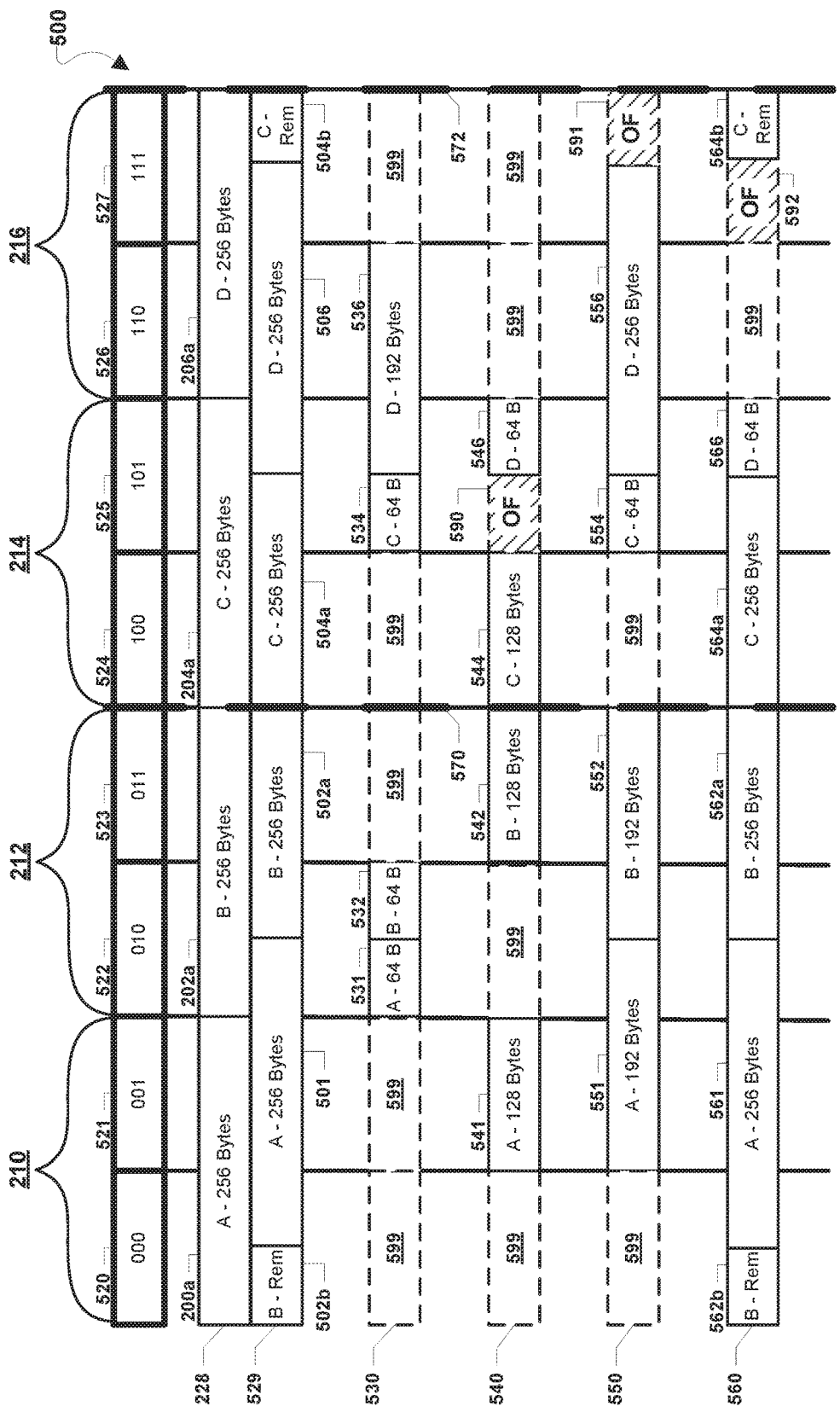
FIG. 5 is a memory structure diagram illustrating offset placements in cache lines of data segments according to another aspect compaction technique.

In some aspects, a computing device may be configured to place data segments with offsets in cache lines in such a way that page boundaries and/or interleaves are not crossed. In other words, the computing device may map 64-Byte data segments outside of a 512-Byte section (or two 256-Byte sections) such that the data segments wrap-around to the beginning of the 512-Byte section to avoid crossing page boundaries and/or interleaves. To illustrate such aspects, FIG. 5 shows offset placements of data segments that are compressed with various compression ratios according to another aspect cache line compaction technique that utilizes such a wrap-around. The diagram 500 of FIG. 5 is similar to the diagram 200 described above with reference to FIG. 2, except that the aspect offset exclusive ranges illustrated in FIG. 5 may not allow data segments to be placed in the cache such that they cross page and/or interleave boundaries greater than 512 Bytes. For clarity of the following descriptions of FIG. 5, a dotted line 570 may indicate a 512-Byte interleave and/or page boundary and a dotted line 572 may indicate a 512-Byte and/or a 1-kB interleave (like dotted line 270 in FIG. 2) and/or page boundary. The aspect offset placements illustrated in FIG. 5 may also result in more even cache bank usage for data segment placements. However, compared to the aspect offset placements illustrated in FIG. 2, the alternative aspect illustrated in FIG. 5 may on average result in half of the data segments compressed at a 4:4 compression ratio to be split into two transactions. In other words, non-contiguous requests to place data segments compressed at a 4:4 compression ratio may result in more split requests than the aspect technique illustrated in FIG. 2.

The aspect technique illustrated by FIG. 5 may be beneficial in reducing most overfetch, especially when used with L3 caches. Further, simple prefetching may be enabled with or without L3 caches. In various aspects, the 4:4 compression ratio may be the least probable compression ratio, and so splitting data segments into two transactions may be less likely than other examples described herein. The examples described herein with reference to FIG. 5 are described in terms of relationships with interleaves 570, 572 for clarity and ease of explanation, and do not limit the descriptions and the claims to exclude aspects in relation to page boundaries.

As illustrated in FIG. 5, cache lines 520-527 may be associated with physical addresses that may increase from left to right (i.e., the physical address of the first cache line 520 is a number less than the number associated with the physical address of the second cache line 521, etc.). In some aspects, the physical addresses of the cache lines 520-527 may be represented by at least 9 bits. FIG. 5 shows indications of the ninth, eighth, and seventh bits of the associated physical addresses of the various cache lines 520-527. For example, the ninth bit (or bit-9) of the first cache line 520 may be a '0' value, the eighth bit (or bit-8) of the first cache line 520 may be a '0' value, and the seventh bit (or bit-7) of the first cache line 520 may be a '0' value, and the ninth bit (or bit-9) of the fifth cache line 524 may be a '1' value, the eighth bit (or bit-8) of the fifth cache line 524 may be a '0' value, and the seventh bit (or bit-7) of the fifth cache line 524 may be a '0' value.

As described above with reference to FIG. 2, a first line 228 of the diagram 500 illustrates default placements of source data segments 200a-206a within the 256-Byte segment boundaries 210-216 when stored in the cache according to typical techniques. A first source data segment 200a (referred to as 'A' in FIG. 5) may be placed by the computing device with no offset to be within the first cache line 520 and the second line 521. A second source data segment 202a (referred to as 'B' in FIG. 5) may be placed by the computing device with no offset to be within the third cache line 522 and the fourth cache line 523. A third source data segment 204a (referred to as 'C' in FIG. 5) may be placed by the computing device with no offset to be within the fifth cache line 524 and the sixth cache line 525. A fourth source data segment 206a (referred to as 'D' in FIG. 5) may be placed by the computing device with no offset to be within the seventh cache line 526 and the eighth cache line 527. The segment boundaries 210-216 may correspond with the exclusive ranges for each of the source data segments 200a-206a within the segment boundaries 210-216.

Line 529 of the diagram 500 illustrates offset source data segments 501, 502a-502b, 504a-504b, 506 corresponding to offset exclusive ranges for mapping compressed forms of the source data segments 200a-206a. Lines 530, 540, 550, 560 of the diagram 500 illustrate offset placements of compressed forms of the source data segments 200a-206a within the offset exclusive ranges that overlap the base addresses in accordance with aspect operations performed by the computing device. In some aspects, the base offsets used by the computing device to place the various compressed data segments may be based on look-ups performed on a predefined data table, such as described in FIG. 6 below.

A second line 529 of the diagram 500 illustrates an offset mapping for compressed data segments to offset exclusive ranges corresponding to offset data segments 501, 502a-502b, 504a-504b, 506. A first offset data segment 501 corresponding to the first source data segment 200a (i.e., 'A') may be mapped by the computing device at a 64-Byte offset to be within half of the first cache line 520, the entire second cache line 521, and half of the third cache line 522. The first offset data segment 501 may overlap into the third cache line 522 by a 64-Byte overlap. A second offset data segment 502a corresponding to the second source data segment 202a (i.e., 'B') may be mapped by the computing device at a 64-Byte offset to be within half of the third cache line 522, and the entire fourth cache line 523. However, to avoid placing compressed data segments crossing interleaves 570, 572, the computing device may be configured to map the 256-Byte second offset data segment 502a in two separate sections. Thus, the remainder 502b of the 256-Byte second offset data segment 502a (referred to as "B-Rem" in FIG. 5) may be mapped by the computing device within the first half of the first cache line 520. A third offset data segment 504a corresponding to the third source data segment 204a (i.e., 'C') may be mapped by the computing device with no offset to be within the fifth cache line 524 and half of the sixth cache line 525. To avoid placing the compressed data segments crossing interleaves 570, 572, similar to the second offset data segment 502a, the third offset data segment 504a may be split into two sections in order to allow a fourth offset data segment 506 corresponding to the fourth source data segment 206a (i.e., 'D') to be mapped by the computing device at a negative 64-Byte offset. The fourth offset data segment 506 may be mapped within half of the sixth cache line 525, the entire seventh cache line 526, and half of the eighth cache line 527. Thus, the remainder 504b of the third compressed data segment 504a may be placed in half of the eighth cache line 527.

A third line 530 of the diagram 500 illustrates offset placement of 64-Byte data segments compressed at a 4:1 compression ratio by the computing device. In particular, a first 64-Byte compressed data segment 531 corresponding to the first source data segment 200a (i.e., 'A') may be placed by the computing device at a 256-Byte offset to be within half of the third cache line 522, and within the offset exclusive range corresponding to the first offset data segment 501. A second 64-Byte compressed data segment 532 corresponding to the second source data segment 202a (i.e., 'B') may be placed by the computing device at a 64-Byte offset to be within the other half of the third cache line 522, and within the offset exclusive range corresponding to the second offset data segment 502a. In other words, the first and second 64-Byte compressed data segments 531, 532 may share the third cache line 522 despite that cache line 522 being typically associated with only the second source data segment 202a (i.e., 'B'), and within the exclusive range corresponding to only the second source data segment 202a. Due to the 256-Byte and 64-Byte offset placements of the first and second 64-Byte compressed data segments 531, 532, respectively, the first cache line 520, second cache line 521, and fourth cache line 523 may include unused data 599. In other words, the computing device may not have been required to fetch any data for these cache lines 520, 521, 523. Such unused cache lines (i.e., the cache lines 520, 521, 523 associated with unused data 599) may be free for the cache to allocate to other requests.

Also referring to the third line 530 of the diagram 500, a third 64-Byte compressed data segment 534 corresponding to the third source data segment 204a (i.e., 'C') may be placed by the computing device at a 128-Byte offset to be within half of the sixth cache line 525, and within the offset exclusive range corresponding to the third offset data segment 504a. A 192-Byte compressed data segment 536 corresponding to the fourth source data segment 206a (i.e., 'D') may be placed by the computing device at a negative 64-Byte offset to be within the other half of the sixth cache line 525 and the entire seventh cache line 526, and within the offset exclusive range corresponding to the fourth offset data segment 506. The 192-Byte compressed data segment 536 may have been compressed by the computing device at a 4:3 compression ratio. Due to the 128-Byte and negative 64-Byte offset placements of the third 64-Byte compressed data segment 534 and 192-Byte compressed data segment 536, respectively, the fifth cache line 524 and the eighth cache line 527 may include unused data 599.

A fourth line 540 of the diagram 500 illustrates offset placement of 128-Byte data segments compressed at a 4:2 compression ratio by the computing device. In particular, a first 128-Byte compressed data segment 541 corresponding to the first source data segment 200a (i.e., 'A') may be placed by the computing device at a 128-Byte offset to be within the second cache line 521, and within the offset exclusive range corresponding to the first offset data segment 501. A second 128-Byte compressed data segment 542 corresponding to the second source data segment 202a (i.e., 'B') may be placed by the computing device at a 128-Byte offset to be within the fourth cache line 523, and within the offset exclusive range corresponding to the second offset data segment 502a. In this way, the first and second 128-Byte compressed data segments 541, 542 may still be stored within their typical segment boundaries 210, 212 corresponding to their exclusive ranges, but may be offset such that the first cache line 520 and the third cache line 522 include unused data 599. In other words, due to the 128-Byte offsets, the computing device may not have been required to fetch any data for these cache lines 520, 523.

Also referring to the fourth line 540 of the diagram 500, a third 128-Byte compressed data segment 544 corresponding to the third source data segment 200c (i.e., 'C') may be placed by the computing device within the fifth cache line 524 with no offset, and within the offset exclusive range corresponding to the third offset data segment 504a. A 64-Byte compressed data segment 546 corresponding to the fourth source data segment 206a (i.e., 'D') may be placed by the computing device at a negative 64-Byte offset to be within half of the sixth cache line 525, and within the offset exclusive range corresponding to the fourth offset data segment 506. In this way, the third 128-Byte compressed data segment 544 and the 64-Byte compressed data segment 546 may still be offset such that the seventh cache line 526 and the eighth cache line 527 include unused data 599. However, due to the 64-Byte compressed data segment 546 not completely filling the sixth cache line 525, the sixth cache line 525 may be half-filled with overfetch data 590.

A fifth line 550 of the diagram 500 illustrates offset placement of 192-Byte data segments compressed at a 4:3 compression ratio by the computing device. In particular, a first 192-Byte compressed data segment 551 corresponding to the first source data segment 200a (i.e., 'A') may be placed by the computing device at a 128-Byte offset to be within the second cache line 521 and half of the third cache line 522, and within the offset exclusive range corresponding to the first offset data segment 501. A second 192-Byte compressed data segment 552 corresponding to the second source data segment 202a (i.e., 'B') may be placed by the computing device at a 64-Byte offset to be within half of the third cache line 522 and the fourth cache line 523, and within the offset exclusive range corresponding to the second offset data segment 502a. In this way, the first and second 192-Byte compressed data segments 551, 552 may be offset to share the third cache line 522, enabling the first cache line 520 to include unused data 599. In other words, due to the combined 192 Bytes of offsets, the computing device may not have been required to fetch any data for the first cache line 520.

Also referring to the fifth line 550 of the diagram 500, a 64-Byte compressed data segment 554 corresponding to the third source data segment 200c (i.e., 'C') may be placed by the computing device at a 128-Byte offset to be within half of the sixth cache line 525, and within the offset exclusive range corresponding to the third offset data segment 504a. A 256-Byte compressed data segment 556 corresponding to the fourth source data segment 206a (i.e., 'D') may be placed by the computing device at a negative 64-Byte offset to be within half the sixth cache line 525, the full seventh cache line 526, and half of the eighth cache line 527, and within the offset exclusive range corresponding to the fourth offset data segment 506. The 256-Byte compressed data segment 556 may have been compressed by the computing device at a 4:4 compression ratio. In this way, the fifth cache line 524 may include unused data 599. However, overfetch data 591 may be within half of the eighth cache line 527.

A sixth line 560 of the diagram 500 illustrates offset placement of 256-Byte data segments compressed at a 4:4 compression ratio by the computing device. In particular, a first 256-Byte compressed data segment 561 corresponding to the first source data segment 200a (i.e., 'A') may be placed by the computing device at a 64-Byte offset to be within half of the first cache line 520, the entire second cache line 521, and half of the third cache line 522, and within the offset exclusive range corresponding to the first offset data segment 501. A second 256-Byte compressed data segment 562a corresponding to the second source data segment 202a (i.e., 'B') may be placed by the computing device at a 64-Byte offset to be within half of the third cache line 522 and the entire fourth cache line 523, and within the offset exclusive range corresponding to the second offset data segment 502a. However, the computing device may be configured to store the second 256-Byte compressed data segment 562a in two separate sections. Thus, the remainder 562b of the second 256-Byte compressed data segment 562a (referred to as "B-Rem" in FIG. 5) may be placed by the computing device within the first half of the first cache line 520, and within the offset exclusive range corresponding to the second offset data segment 502b. A third compressed data segment 564a corresponding to the third source data segment 204a (i.e., 'C') may be placed by the computing device with no offset to be within the fifth cache line 524 and half of the sixth cache line 525, and within the offset exclusive range corresponding to the third offset data segment 504a. To avoid placing the compressed data segments crossing interleaves 570, 572, similar to the second compressed data segment 502a, the third compressed data segment 564a may be split into two sections in order to allow a 64-Byte compressed data segment 566 corresponding to the fourth source data segment 206a (i.e., 'D') to be placed by the computing device at a negative 64-Byte offset to be within half of the sixth cache line 525. The 64-Byte compressed data segment 566 may be placed within the offset exclusive range corresponding to the fourth offset data segment 506. Thus, the remainder 564b of the third compressed data segment 564a may be placed in half of the eighth cache line 527, and within the offset exclusive range corresponding to the third offset data segment 504b. However, overfetch data 592 may be within half of the eighth cache line 527.

FIG. 6 is a diagram illustrating a data table including base offset values corresponding to compression ratios and base address parity values suitable for use in some aspects. As described above with reference to FIG. 5, a computing device implementing an aspect compaction technique may perform lookups on the data table 600 using compression ratio information 610 and base address parity information 602 for a particular compressed data segment to identify the size of base offset that should be used to place (or access) the data segment within a cache. In some aspects, the data table 600 may be a two-dimensional (2D) array stored within memory of the computing device.

Such a data table 600 may be similar to the data table 300 described above with reference to FIG. 3, except the base address parity information 602 of FIG. 6 may be an indication of the values of the bit-8 and the bit-9 for the data segment's base address (e.g., 0 or 1 for the two bits). In other words, lookups performed on the data table 600 may require a two-bit value and a compression ratio in order for the computing device to identify a base offset value to apply to a base address (e.g., a physical address) of a data segment. Another difference between the data table 600 and the data table 300 described in FIG. 3 is that the data table 600 may store more than one base offset value for certain compression ratios (e.g., 4:4 compression ratio) and two-bit values associated with data segment addresses (e.g., physical addresses). In particular, when segments are required to be split into two transaction to avoid crossing page boundaries and/or interleaves, the data table 600 may include a first base offset value for a first transaction and a second base offset value for a second transaction. In such cases, the data table 600 may indicate the size of each transaction that is associated with each of the base offset values. In some aspects, the computing device may use other combinations of bits to perform lookups, wherein such combinations may be based on the hashing of stored data.

For example, in response to performing a lookup on the data table 600 for a data segment that is compressed at a 4:1 compression rate and has a base address with a 0 value for its bit-9 and a 0 value for its bit-8, the computing device may identify a 256-Byte base offset. In response to performing a lookup on the data table 600 for a data segment that is compressed at a 4:1 compression rate and has a base address with a 0 value for its bit-9 and a 1 value for its bit-8, the computing device may identify a 64-Byte base offset. In response to performing a lookup on the data table 600 for a data segment that is compressed at a 4:1 compression rate and has a base address with a 1 value for its bit-9 and a 0 value for its bit-8, the computing device may identify a 128-Byte base offset. In response to performing a lookup on the data table 600 for a data segment that is compressed at a 4:1 compression rate and has a base address with a 1 value for its bit-9 and a 1 value for its bit-8, the computing device may identify a negative 64-Byte base offset.

As another example, in response to performing a lookup on the data table 600 for a data segment that is compressed at a 4:2 compression rate and has a base address with a 0 value for its bit-9 and a 0 value for its bit-8, the computing device may identify a 128-Byte base offset. In response to performing a lookup on the data table 600 for a data segment that is compressed at a 4:2 compression rate and has a base address with a 0 value for its bit-9 and a 1 value for its bit-8, the computing device may identify a 128-Byte base offset. In response to performing a lookup on the data table 600 for a data segment that is compressed at a 4:2 compression rate and has a base address with a 1 value for its bit-9 and a 0 value for its bit-8, the computing device may identify a 0-Byte base offset (i.e., no base offset). In response to performing a lookup on the data table 600 for a data segment that is compressed at a 4:2 compression rate and has a base address with a 1 value for its bit-9 and a 1 value for its bit-8, the computing device may identify a 0-Byte base offset (i.e., no base offset).

As another example, in response to performing a lookup on the data table 600 for a data segment that is compressed at a 4:3 compression rate and has a base address with a 0 value for its bit-9 and a 0 value for its bit-8, the computing device may identify a 128-Byte base offset. In response to performing a lookup on the data table 600 for a data segment that is compressed at a 4:3 compression rate and has a base address with a 0 value for its bit-9 and a 1 value for its bit-8, the computing device may identify a 64-Byte base offset. In response to performing a lookup on the data table 600 for a data segment that is compressed at a 4:3 compression rate and has a base address with a 1 value for its bit-9 and a 0 value for its bit-8, the computing device may identify a 0-Byte base offset (i.e., no base offset). In response to performing a lookup on the data table 600 for a data segment that is compressed at a 4:3 compression rate and has a base address with a 1 value for its bit-9 and a 1 value for its bit-8, the computing device may identify a negative 64-Byte base offset.

As another example, in response to performing a lookup on the data table 600 for a data segment that is compressed at a 4:4 compression rate and has a base address with a 0 value for its bit-9 and a 0 value for its bit-8, the computing device may identify a 64-Byte base offset. In response to performing a lookup on the data table 600 for a data segment that is compressed at a 4:4 compression rate and has a base address with a 0 value for its bit-9 and a 1 value for its bit-8, the computing device may identify a negative 256-Byte base offset for a first transaction that is 64 Bytes in size and a 64-Byte base offset for a second transaction that is 192 Bytes in size. In response to performing a lookup on the data table 600 for a data segment that is compressed at a 4:4 compression rate and has a base address with a 1 value for its bit-9 and a 0 value for its bit-8, the computing device may identify a 0-Byte base offset for a first transaction that is 192 Bytes in size and a 448-Byte base offset for a second transaction that is 64 Bytes in size. In response to performing a lookup on the data table 600 for a data segment that is compressed at a 4:4 compression rate and has a base address with a 1 value for its bit-9 and a 1 value for its bit-8, the computing device may identify a negative 64-Byte base offset.

FIG. 7A illustrates exemplary pseudo code 700 of a function that may be executed by a computing device in order to identify new addresses for offset placement of compressed data segments within a cache according to another aspect cache line compaction technique. For example, a computing device may be configured with instructions as described below in order to place data segments as illustrated in FIG. 5 above. The pseudo code 700 of FIG. 7A is similar to the pseudo code 400 of FIG. 4A described above, except that the pseudo code 700 may include instructions to cause the computing device to utilize two bits (i.e., bit-8 and bit-9) of a base address (e.g., a physical address) when performing lookup operations to identify base offsets, and further may be configured to potentially return two offset addresses. Such offset addresses may be offset physical addresses or offset virtual addresses dependent upon whether the base address is a physical address or a virtual address. The function illustrated by the pseudo code 700 may be executed by the computing device as part of an application, firmware, an application programming interface (API), a routine, and/or operations, such as during or after the execution of a compression routine (e.g., a compression routine on a data set). It should be appreciated that such pseudo code 700 is provided for general illustration purposes, and thus is not intended to represent any particular programming language, structure, or formatting that may be operational.

The pseudo code 700 (referred to as "Pseudo code B" in FIG. 7A) may represent a function called "getNewAddress_bit8-9 ( )" that may require a Base_Address input parameter and a Compression_Ratio input parameter related to a particular data segment. In some aspects, the Base_Address may be a binary representation of a physical address. The operational content of the function may include instructions for the computing device to perform a first shift right operation on the Base_Address input parameter in order to move a bit-8 of the data segment's base address to the rightmost bit for storage in a Shift variable. Such a shift may also move the bit-9 of the Base_Address to the second rightmost bit in the Shift variable. The function may include instructions for performing a bitwise AND operation (or '&' in FIG. 7A) on the shifted address (i.e., the Shift variable) and a '1' value for the two rightmost bits (e.g., " . . . 011") that may generate a value stored in a Parity variable. In other words, the bitwise AND operation may zero-out any other bits in the shifted address (i.e., Shift variable) so that the shifted address may be used as a parity value for performing lookups.

The function illustrated by the pseudo code 700 may also include instructions for the computing device to use the Compression_Ratio input parameter and the calculated Parity variable to perform lookup operations on a predefined table, such as described with reference to FIG. 5. However, as there are two possible cases that may require more than one base offset value to be returned from a table lookup, the function may include evaluate whether the Compression_Ratio is equal to 4:4 or whether the value of the Parity variable indicates the bit-9 and bit-8 are the same (i.e., " . . . 00" or " . . . 11"). If the computing device determines that either the Compression_Ratio is equal to 4:4 or the value of the Parity variable indicates the bit-9 and bit-8 are the same (i.e., " . . . 00" or " . . . 11"), the computing device may perform a lookup operation using the Compression_ Ratio and Parity to retrieve a single offset value to be stored in the Offset variable. Such a single offset value may be combined with the Base_Address and returned for use in offset placement.

However, if the computing device determines that the Compression_Ratio is equal to 4:4 and the value of the Parity variable indicates the bit-9 and bit-8 are not the same (i.e., " . . . 01" or " . . . 10"), the computing device may perform a lookup operation using the Compression_Ratio and Parity to retrieve two offset values to be stored in the Offset[ ] array variable. Each of the two offset values may be combined with the Base_Address individually to generate new addresses for two transactions for a data segment. In various aspects, the sizes of the two transactions may be returned as well as the offset values. In some aspects, another call or function may be utilized to separately calculate and/or return sizes and offset values for such transactions.

In some aspects, the computing device may be configured with simplified logic, circuits, software instructions, and/or routines to generate new addresses instead of utilizing a table lookup as indicated with the pseudo code 700.

FIGS. 7B-7C illustrate exemplary pseudo code and values that may be used in an invocation of the function of the pseudo code 700 described in FIG. 7A. It should be appreciated the example values in FIGS. 7B-7C are for illustration purposes, and are not intended to limit the scope of the aspects.

FIG. 7B illustrates exemplary pseudo code 750 that may be performed by a computing device to invoke the exemplary function for determining a new offset address for a data segment as described above in FIG. 7A. The exemplary pseudo code 750 may include instructions for setting values for the Base_Address and Compression_Ratio variables that may be used as input parameters for a call to the getNewAddress_bit8-9( ) function. For example, the Base_Address may be set as a physical address for a data segment (e.g., " . . . 100000000"), where the physical address includes at least nine bits. As another example, the Compression_Ratio variable may be set as a value (e.g., 4:4) that indicates the level of compression (or compression ratio) the computing device has compressed the data segment using a compression algorithm. The pseudo code 750 may include a call to the function getNewAddress_bit8-9( ) using these input parameters and values, and may enable the computing device to store a return value from the function in a new_address variable, such as a new physical address for the data segment that enables an offset placement in a cache line.

FIG. 7C illustrates exemplary pseudo code 760 that is similar to the pseudo code 700 of FIG. 7A but that also includes exemplary values for the various instructions based on the input parameter values described above in FIG. 7B. In other words, the pseudo code 760 is the functional equivalent of the exemplary pseudo code 700 of FIG. 7A with added indications of the exemplary values of calculations performed as part of the function getNewAddress_bit8-9( ).

For example, in FIG. 7C, the function may utilize a Base_Address input parameter with a value of " . . . 100000000" and a Compression_Ratio input parameter with a value of "4:4". In response to performing a shift right operation on the Base_Address input parameter, the computing device may generate a value of " . . . 000000010" in order to move the bit-8 of the data segment's base address (e.g., physical address) to the rightmost bit for storage in a Shift variable. The function may include instructions for performing a bitwise AND operation on the Shift variable and a " . . . 11" value that may generate a value stored in a Parity variable. For example, when the Shift variable has a value of " . . . 000000010", the bitwise AND operation may produce a Parity variable value of " . . . 000000010".

As the example Compression_Ratio is "4:4" and the example Parity variable value is not equal to " . . . 00" or " . . . 11", the computing device may not perform operations that retrieve a single base offset value from a lookup table. Instead, the computing device may perform instructions to perform a lookup that returns two base offset values. In particular, with the exemplary Parity variable value of " . . . 000000010" and the exemplary value of "4:4" for the Compression_Ratio, the results of a lookup operation on the predefined table described in FIG. 6 may return a first base offset value of 0 Bytes and a second base offset value of 448 Bytes. In some aspects, the results of the lookup may also include the sizes of the transactions associated with the base offset values. The function may then return two new base offset addresses for two transactions for the data segment, a first address that is the combination of the 0 Bytes and the Base_Address (e.g., " . . . 100000000"+0 Bytes) and a second address that is the combination of the 448 Bytes and the Base_Address (e.g., " . . . 100000000"+448 Bytes).

Figure 8A:
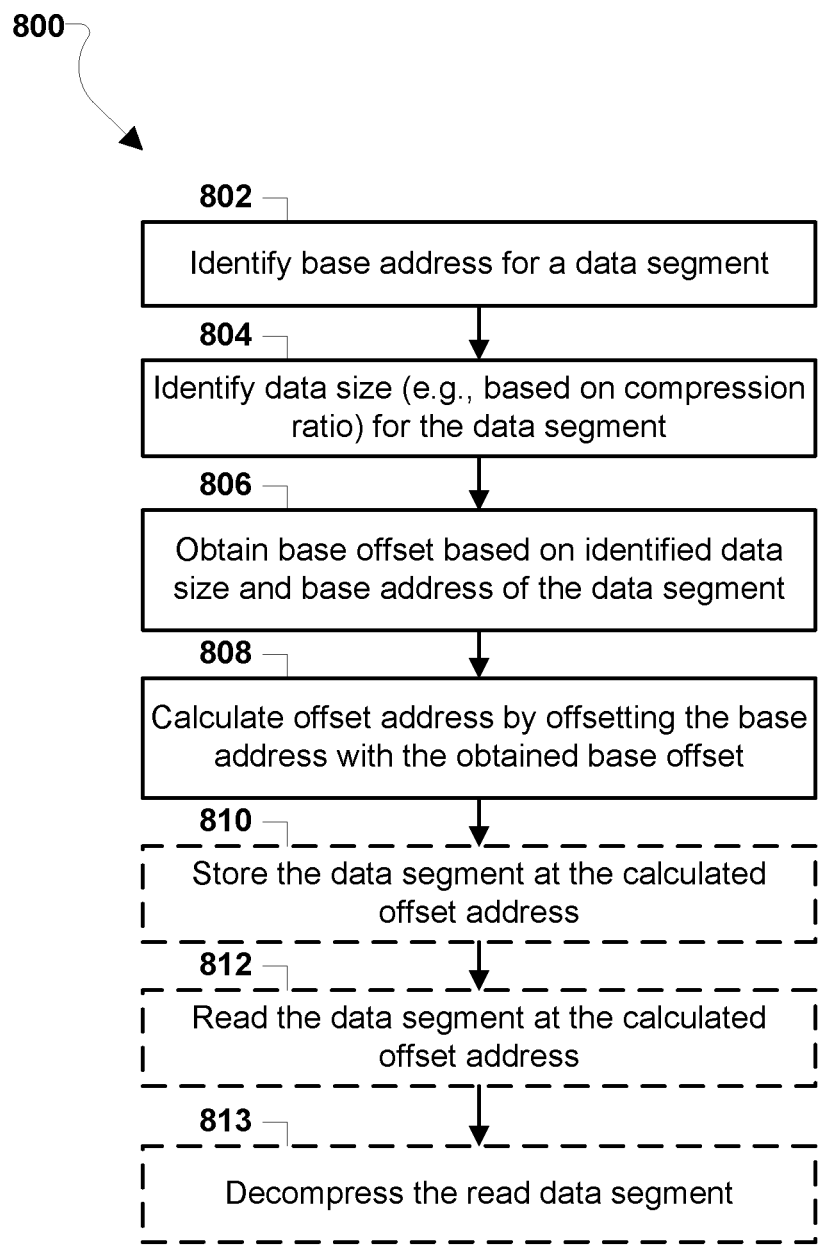
FIGS. 8A-8C are process flow diagrams illustrating aspect methods for a computing device to compact data within cache lines of a cache.

FIG. 8A illustrates an aspect method 800 for a computing device to compact data within cache lines of a cache. The method 800 may be performed by the computing device as a routine, application, function, or other operations that may occur in combination or in response to the computing device performing conventional compression algorithms. For example, in response to compressing data segments, the computing device may perform the operations of the method 800 to place the compressed data segments with offsets such that the data segments overlap on cache lines. Although the following descriptions may refer to a single data segment that may be placed in an offset address (e.g., an offset physical address), it should be appreciated that the computing device may be configured to execute the method 800 to place a plurality of data segments, such as in a loop. Further, it should be appreciated that the computing device may perform the operations of the method 800 to place any variable length data (compressed or uncompressed) into various types of memory unit or cache unit. In some aspects, the computing device may be configured to perform the operations of the method 800 to place data segments that were compressed by another device.

In block 802, the processor of the computing device may identify a base address (e.g., a base physical address or a base virtual address) for a data segment. As described above, such a base address may be a cache line or cache address that the data segment is typically associated. For example, the base address may be an address of a first cache line in which the data segment (or source data segment) is stored when in an uncompressed state. The base address may be the initial starting address for the data segment, but it may not indicate the number of cache lines (or cache space) the data segment may require to be stored. In some aspects, the base address may be the starting address of a requested block in memory that may be represented by allocated lines in the cache but generally may not be, as the cache may allocate for compressed versions.

In block 804, the processor of the computing device may identify a data size (e.g., based on a compression ratio) for the data segment. For example, an identified data size may be based on a compression ratio of the data segment as identified by the computing device performing a read operation to another data buffer to obtain the compression ratio. In various aspects, dependent upon the type of compression algorithms the computing device is configured to utilize, there may be a plurality of available compression ratios for the data segment. For example, when the computing device is configured to utilize a compression algorithm, the data segment may be compressed at a 4:1 compression ratio, a 4:2 compression ratio (or a 2:1 compression ratio), a 4:3 compression ratio, and/or a 4:4 compression ratio (or a 1:1 compression ratio). The identified data size for the data segment may be based on the compression ratio that results in the greatest possible reduction of the size of the data segment (or maximum compression). In various aspects, the identified data size (or compression size) may be different for different types of data, data structures, and/or contexts. For example, the computing device may identify a first data size for a first compression ratio for a first data segment of a first data type, but a second data size for a second compression ratio for a second data segment of a second data type.

Figure 8B:
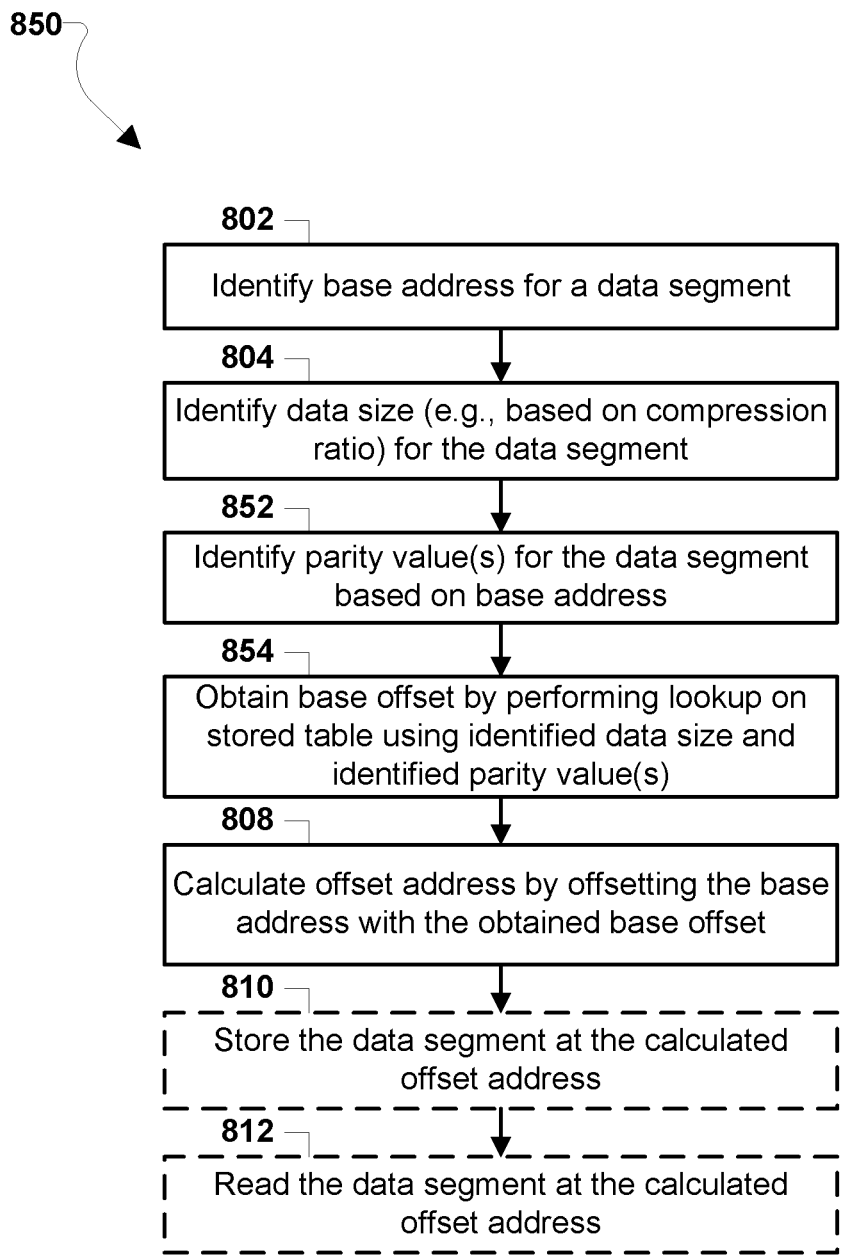

In block 806, the processor of the computing device may obtain a base offset based on the identified data size and the base address of the data segment. The base offset may be a number of bytes, such as 64 Bytes, 128 Bytes, 192 Bytes, and/or 256 Bytes. In some aspects, the base offset may be a negative number of Bytes, such as negative 64 Bytes. In some aspects, the size of a base offset may be a multiple of the size of half a cache line of a cache in the computing device. In some aspects, the computing device may perform a lookup on a data table as described above with reference to FIG. 3 or FIG. 6, and retrieve a base offset value. In some aspects, the computing device may utilize an equation, routine, circuitry, and/or software module to determine the base offset. FIG. 8B illustrates specific aspect operations for obtaining a base offset.

In block 808, the processor of the computing device may calculate an offset address by offsetting the base address with the obtained base offset. For example, the computing device may combine the obtained base offset (e.g., a number of bytes) with the base address to calculate a new address (e.g., a new physical address) that occurs before or after the base address in a cache. Such a calculation may result in an offset address that is larger than the base address when the obtained base offset is a positive value and an offset address that is smaller than the base address when the obtained base offset is a negative value. In optional block 810, the processor of the computing device may store the data segment at the calculated offset address. In other words, the calculated offset address may be used to populate a cache. For example, the computing device may read the data segment from a memory (e.g., DDR) and load the data segment within one or more cache lines starting at the offset address. In some aspects, the computing device may read the data segment as a compressed data segment from compressed memory. In optional block 812, the processor of the computing device may read the data segment at the calculated offset address. In other words, the calculated offset address may be used to retrieve or find data segments previously stored within cache lines. For example, the computing device may use the calculated offset address to retrieve a data segment from the cache for use in an operation of an application, etc. Further, the reading of the operations in optional block 812 may be of a specified size, such as the data size determined above. In optional block 813, the processor of the computing device may decompress the read data segment. In some aspects, the decompressed data segment may be stored locally, such as within its associated base address.

In some aspects, the data segment may not be in the cache, and may need to be fetched from memory and inserted into the cache. In some aspects, there may be no cache, and prefetching may be benefitted by the various aspect techniques.

FIG. 8B illustrates an aspect method 850 for a computing device to compact data within cache lines of a cache. The operations of method 850 are similar to the operations of the method 800 described above with reference to FIG. 8A, except the method 850 may include operations for performing lookup operations in predefined data tables of offset values. For example, the computing device may be configured to use information about a base address and a compression ratio to retrieve offset values from data tables as described above with reference to FIGS. 3 and 6.

The operations in blocks 802-804, 808-812 may be the same as described above with reference to FIG. 8A. In block 852, the processor of the computing device may identify parity value(s) for the data segment based on the base address. In some aspects, the computing device may evaluate a bit-8 in the base address to identify a parity value that indicates whether the bit-8 is an even value (i.e., 0) or an odd value (i.e., 1). Use of such a parity value is illustrated in FIGS. 2-4C. In some aspects, in order to identify the parity value, the computing device may perform a shift-right operation to a binary representation of the base address to make a bit-8 a rightmost bit and apply a bitwise AND operation to a " . . . 001" binary value and the binary result of the shift-right operation to identify the parity value. In some aspects, the computing device may evaluate a bit-9 and a bit-8 of the base address to identify whether the two bits match predefined combinations that may be used as indices in a data table or 2D array (e.g., "00", "01", "10", "11"). Use of such parity values is illustrated in FIGS. 5-7C. In some aspects, in order to identify the parity values, the computing device may perform a shift-right operation to a binary representation of the base address to make a bit-8 a rightmost bit and apply a bitwise AND operation to a " . . . 011" binary value and the binary result of the shift-right operation to identify the parity values (e.g., zero-out all values in the binary result of the shift-right operation except the 8-bit and 9-bit of the binary representation of the base address).

In block 854, the processor of the computing device may obtain a base offset by performing a lookup on a stored table using the identified data size (e.g., a size based on an identified compression ratio) and the identified parity value(s). For example, the computing device may use a representation or code of an identified compression ratio (e.g., 4:1, etc.) and the parity value(s) as indices on a data table or 2D array, as illustrated in FIGS. 3 and 6. In some aspects, the obtained offset may include a first offset for a first transaction and a second offset for a second transaction as described above. For example, to avoid allowing the offset data segment to cross an interleave and/or page boundary, the data segment may be split into two transactions that are associated with a first offset (e.g., 0 Bytes) and a second offset (e.g., 448 Bytes) from the base address. The computing device may continue with the operations in block 808 to calculate the offset address. In some aspects, when the obtained base offset includes two offsets, the computing device may calculate two offset addresses for placing split segments into the cache.

Figure 8C:
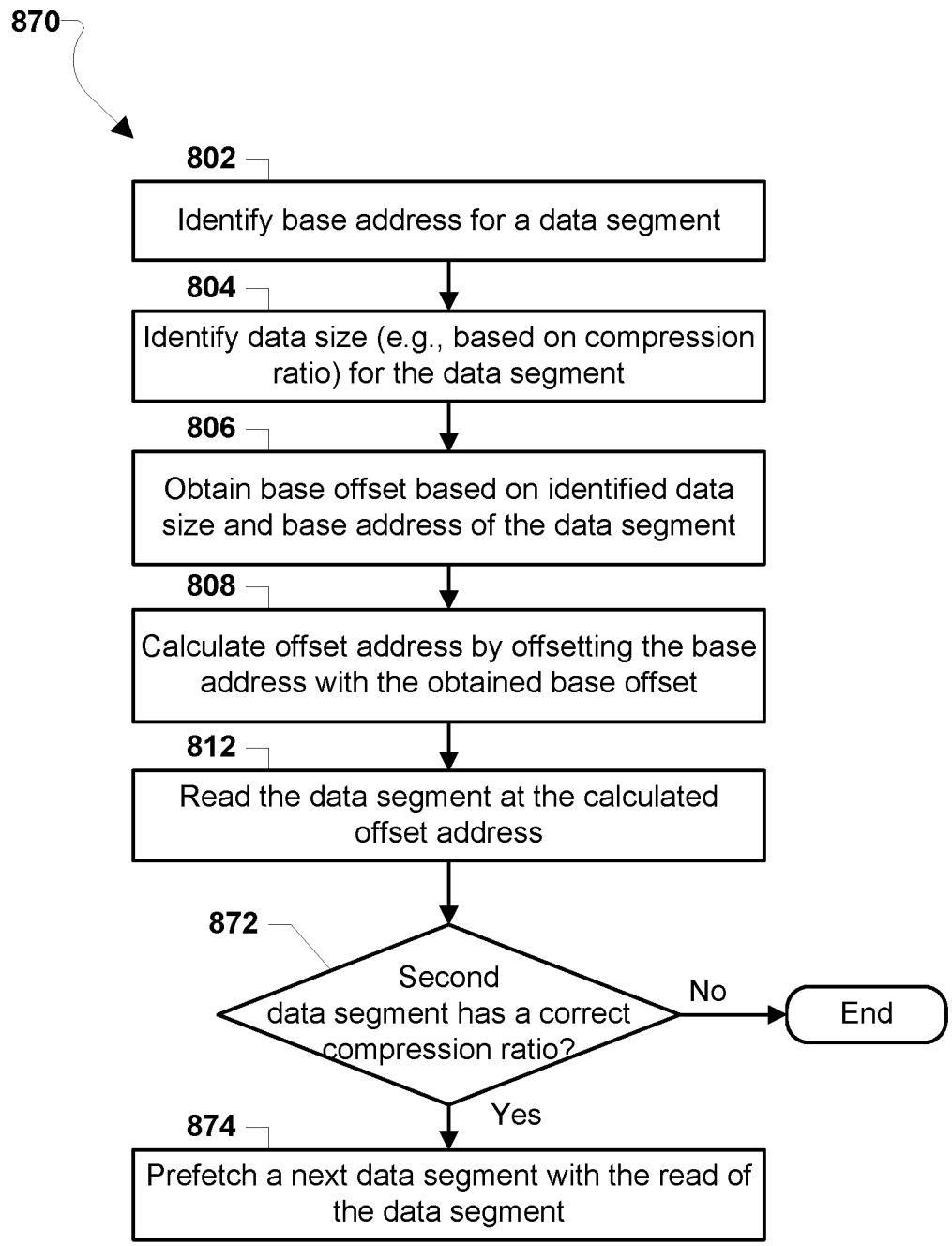

FIG. 8C illustrates an aspect method 870 for a computing device to compact data within cache lines of a cache. The operations of method 870 are similar to the operations of the method 800 described above with reference to FIG. 8A, except the method 870 may include operations for prefetching a next data segment. The operations in blocks 802-804, 808-812 may be the same as described above with reference to FIG. 8A.

In determination block 872, the processor of the computing device may determine whether a next data segment (or second data segment) has a correct compression ratio to be contiguous with the data segment (or first data segment) that was read with the operations in block 812. For example, when the computing device is configured to perform optional prefetching with a larger read request size, the computing device may retrieve or read the next data block (or compressed data block) next to the data segment for which the operations of blocks 802-808 were performed to size and identify within the cache. Such a determination may be based on logic testing routines or a circuit that is configured to determine whether the data block next to the read data segment has the correct compression level to be contiguous with the read data segment. In other words, the computing device may determine whether the next data segment is compressed to a size such that the read of the data segment may include the next data segment as well. In response to determining that the next data segment has the correct compression ratio to be contiguous (i.e., determination block 872="Yes"), the processor of the computing device may prefetch the next data segment with the read of the other data segment in block 874. In response to determining that the next data segment does not have the correct compression ratio to be contiguous (i.e., determination block 872="No"), the processor of the computing device may end the method 870.

Figure 9:
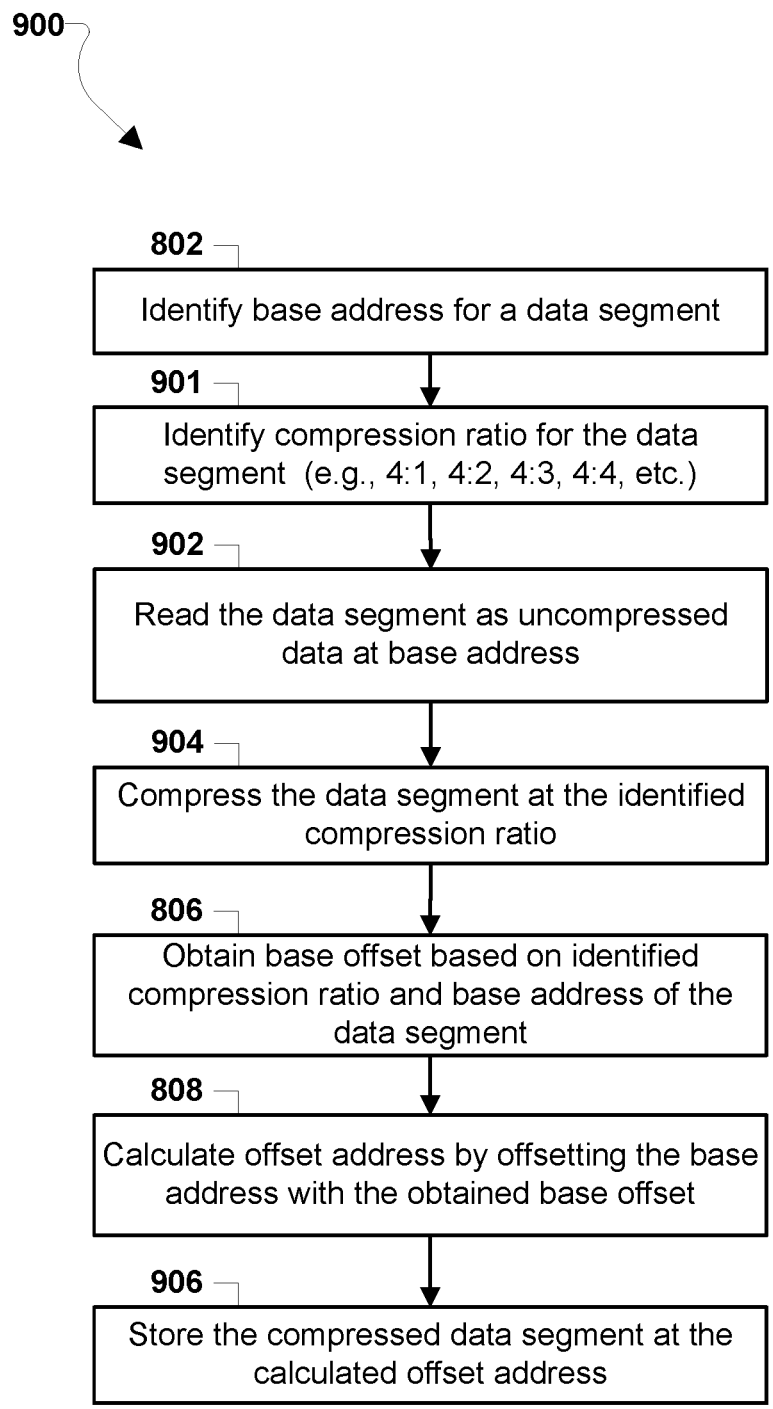
FIG. 9 is a process flow diagram illustrating an aspect method for a computing device to compress and compact data within cache lines of a cache.

FIG. 9 illustrates an aspect method 900 for a computing device to compact data within cache lines of a cache in response to compressing a data segment. The operations of method 900 are similar to the operations of the method 800 described above with reference to FIG. 8A, except the method 900 may include operations for the computing device to also compress the data segment, such as by executing a compression algorithm, prior to storing the data segment in an offset address.

The operations in blocks 802, 808-808 may be the same as described above with reference to FIG. 8A. In block 901, the processor of the computing device may identify a compression ratio for the data segment, such as an optimal compression ratio (e.g., 4:1, 4:2, 4:3, 4:4, etc.) to which the data segment may be compressed. The operations in block 901 may be similar to those described above with reference to block 804 of FIG. 8. In block 902, the processor of the computing device may read the data segment as uncompressed data at the base address, such as by reading the data segment from the cache. In block 904, the processor of the computing device may compress the data segment at the identified compression ratio. For example, based on the maximum identified compression ratio available for the data segment (e.g., 4:1, 4:2, 4:3, 4:4, etc.), the computing device may execute a compression algorithm or routine to cause the data segment to be reduced in size. As described above, the computing device may obtain the base offset in block 806 and calculate the offset address in block 808. In block 906, the processor of the computing device may store the compressed data segment at the calculated offset address.

Figure 10:
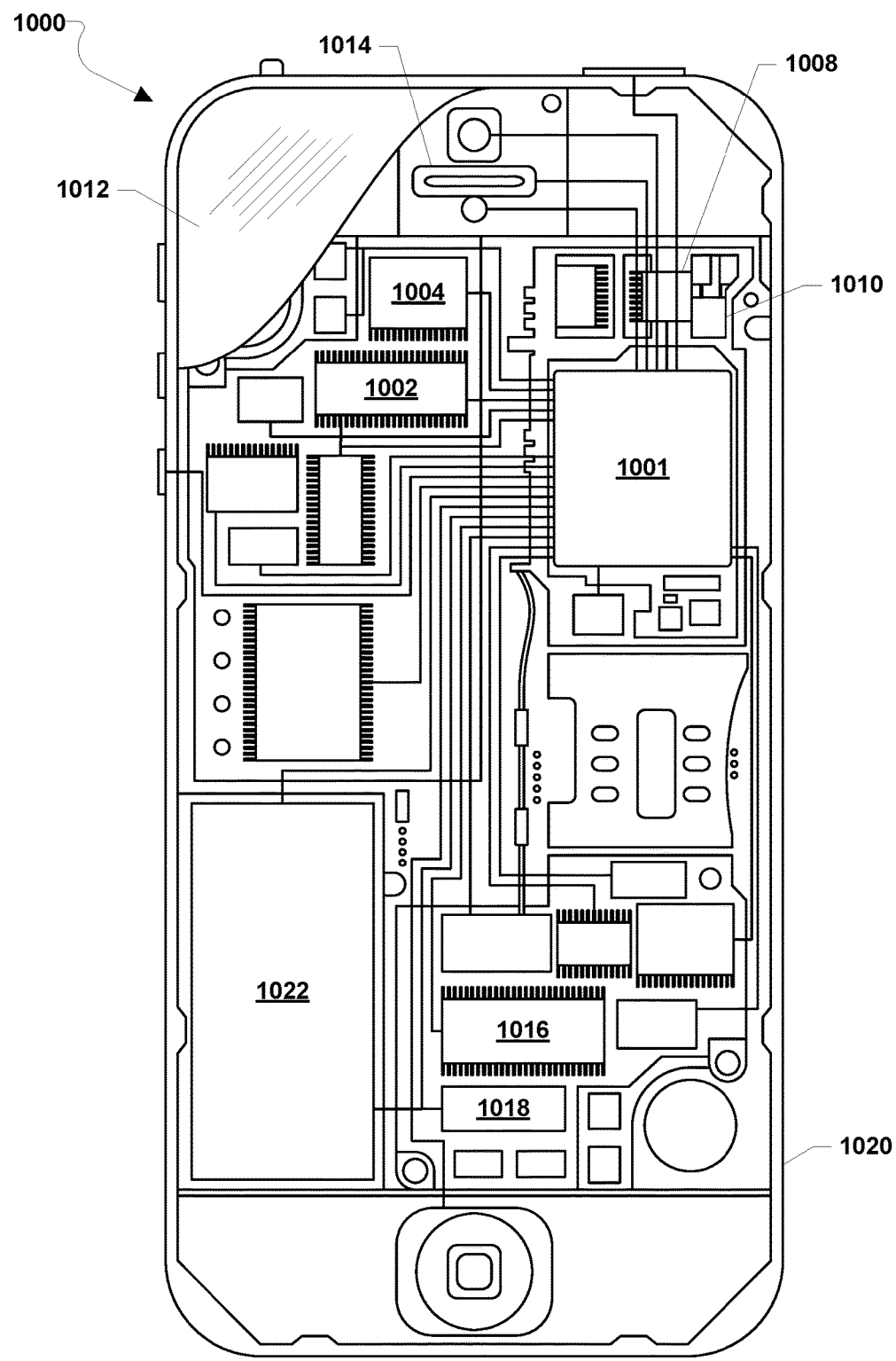
FIG. 10 is a component block diagram of a computing device suitable for use in various aspects.

Various forms of computing devices (e.g., personal computers smartphones, laptop computers, etc.) may be used to implement the various aspects. Such computing devices typically include the components illustrated in FIG. 10 which illustrates an example computing device 1000. In various aspects, the computing device 1000 may include a processor 1001 coupled to a touch screen controller 1004 and an internal memory 1002. The processor 1001 may be one or more multicore ICs designated for general or specific processing tasks. The internal memory 1002 may be volatile or non-volatile memory, and may also be secure and/or encrypted memory, or unsecure and/or unencrypted memory, or any combination thereof. The touch screen controller 1004 and the processor 1001 may also be coupled to a touch screen panel 1012, such as a resistive-sensing touch screen, capacitive-sensing touch screen, infrared sensing touch screen, etc. In some aspects, the computing device 1000 may have one or more radio signal transceivers 1008 (e.g., Peanut®, Bluetooth®, Zigbee®, Wi-Fi, RF radio) and antennae 1010, for sending and receiving, coupled to each other and/or to the processor 1001. The transceivers 1008 and antennae 1010 may be used with the above-mentioned circuitry to implement the various wireless transmission protocol stacks and interfaces. In some aspects, the computing device 1000 may include a cellular network wireless modem chip 1016 that enables communication via a cellular network and is coupled to the processor. The computing device 1000 may include a peripheral device connection interface 1018 coupled to the processor 1001. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The computing device 1000 may also include speakers 1014 for providing audio outputs. The computing device 1000 may also include a housing 1020, constructed of a plastic, metal, or a combination of materials, for containing all or some of the components discussed herein. The computing device 1000 may include a power source 1022 coupled to the processor 1001, such as a disposable or rechargeable battery. The rechargeable battery may also be coupled to the peripheral device connection port to receive a charging current from a source external to the computing device 1000.

The processor 1001 may be any programmable microprocessor, microcomputer or multiple processor chip or chips that can be configured by software instructions (e.g., applications) to perform a variety of functions, including the functions of the various aspects described above. In the various devices, multiple processors may be provided, such as one processor dedicated to wireless communication functions and one processor dedicated to running other applications. Typically, software applications may be stored in the internal memory 1002 before they are accessed and loaded into the processor 1001. The processor 1001 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1001 including internal memory or removable memory plugged into the various devices and memory within the processor 1001.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable instructions which may reside on a non-transitory computer-readable storage medium, a non-transitory server-readable storage medium, and/or a non-transitory processor-readable storage medium. For example, such instructions may be stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for compacting data within cache lines of a cache of a computing device, comprising:

offsetting a first base address of a first exclusive range in the cache of a first source data segment by a first offset related to a data size of a first compressed data segment to produce a first offset address in the cache for the first compressed data segment;

storing the first compressed data segment at the first offset address with a first part of the first compressed data segment on a first part of a cache line within a second exclusive range of a second source data;

offsetting a second base address of the second exclusive range in the cache by a second offset related to a data size of a second compressed data segment to produce a second offset address in the cache for the second compressed data segment;

storing the second compressed data segment at the second offset address with a first part of the second compressed data segment on at least a second part of the cache line within the second exclusive range;

determining whether storing a second part of the second compressed data segment contiguous with the first part of the second compressed data segment will cross a boundary; and storing the second part of the second compressed data segment at a third offset address within the first exclusive range in response to determining that storing the second part of the second compressed data segment contiguous with the first part of the second compressed data segment will cross the boundary, wherein the first exclusive range and the second exclusive range are on a same side of the boundary.

2. The method of claim 1, wherein storing the first compressed data segment at the first offset address comprises storing a second part of the first compressed data segment within the first exclusive range.

3. The method of claim 1, further comprising calculating either the first offset or the second offset to store the first compressed data segment and the second compressed data segment together to completely fill at least one cache line including the cache line within the second exclusive range.

4. The method of claim 3, wherein calculating either the first offset or the second offset to store the first compressed data segment and the second compressed data segment together to completely fill the at least one cache line comprises calculating either the first offset or the second offset to store the first compressed data segment and the second compressed data segment together to contiguous cache lines.

5. The method of claim 1, wherein the data size of the first compressed data segment includes a first compression ratio of the first compressed data segment and the data size of the second compressed data segment includes a second compression ratio of the second compressed data segment, and the method further comprising:

calculating the first offset using the first compression ratio of the first compressed data segment and the first base address; and calculating the second offset using the second compression ratio of the second compressed data segment and the second base address.

6. The method of claim 5, wherein calculating the first offset or the second offset comprises calculating the first offset independent of the second compression ratio or calculating the second offset independent of the first compression ratio.

7. The method of claim 1, further comprising offsetting all base addresses, including the first base address and the second base address, by a same amount.

8. The method of claim 1, wherein the first part of the first compressed data segment is all of the first compressed data segment.

9. A computing device, comprising:
a processor configured with processor-executable instructions to:
offset a first base address of a first exclusive range in a cache of a first source data segment by a first offset related to a data size of a first compressed data segment to produce a first offset address in the cache for the first compressed data segment;

store the first compressed data segment at the first offset address with a first part of the first compressed data segment on a first part of a cache line within a second exclusive range of a second source data;

offset a second base address of the second exclusive range in the cache by a second offset related to a data size of a second compressed data segment to produce a second offset address in the cache for the second compressed data segment;

store the second compressed data segment at the second offset address with a first part of the second compressed data segment on at least a second part of the cache line within the second exclusive range;

determine whether storing a second part of the second compressed data segment contiguous with the first part of the second compressed data segment will cross a boundary; and store the second part of the second compressed data segment at a third offset address within the first exclusive range in response to determining that storing the second part of the second compressed data segment contiguous with the first part of the second compressed data segment will cross the boundary, wherein the first exclusive range and the second exclusive range are on a same side of the boundary.

10. The computing device of claim 9, wherein the processor is further configured with processor-executable instructions to store the first compressed data segment at the first offset address by storing a second part of the first compressed data segment within the first exclusive range.

11. The computing device of claim 9, wherein the processor is further configured with processor-executable instructions to calculate either the first offset or the second offset to store the first compressed data segment and the second compressed data segment together to completely fill at least one cache line including the cache line within the second exclusive range.

12. The computing device of claim 11, wherein the processor is further configured with processor-executable instructions to calculate either the first offset or the second offset to store the first compressed data segment and the second compressed data segment together to completely fill the at least one cache line by calculating either the first offset or the second offset to store the first compressed data segment and the second compressed data segment together to contiguous cache lines.

13. The computing device of claim 9, wherein the data size of the first compressed data segment includes a first compression ratio of the first compressed data segment and the data size of the second compressed data segment includes a second compression ratio of the second compressed data segment, and wherein the processor is further configured with processor-executable instructions to:
calculate the first offset using the first compression ratio of the first compressed data segment and the first base address; and
calculate the second offset using the second compression ratio of the second compressed data segment and the second base address.

14. The computing device of claim 13, wherein the processor is further configured with processor-executable instructions to calculate the first offset or the second offset by calculating the first offset independent of the second compression ratio or calculating the second offset independent of the first compression ratio.

15. The computing device of claim 9, wherein the processor is further configured with processor-executable instructions to offset all base addresses, including the first base address and the second base address, by a same amount.

16. The computing device of claim 9, wherein the first part of the first compressed data segment is all of the first compressed data segment.

17. A computing device, comprising:
  means for offsetting a first base address of a first exclusive range in a cache of a first source data segment by a first offset related to a data size of a first compressed data segment to produce a first offset address in the cache for the first compressed data segment;
  means for storing the first compressed data segment at the first offset address with a first part of the first compressed data segment on a first part of a cache line within a second exclusive range of a second source data;
  means for offsetting a second base address of the second exclusive range in the cache by a second offset related to a data size of a second compressed data segment to produce a second offset address in the cache for the second compressed data segment;
  means for storing the second compressed data segment at the second offset address with a first part of the second compressed data segment on at least a second part of the cache line within the second exclusive range;
  means for determining whether storing a second part of the second compressed data segment contiguous with the first part of the second compressed data segment will cross a boundary; and
  means for storing the second part of the second compressed data segment at a third offset address within the first exclusive range in response to determining that storing the second part of the second compressed data segment contiguous with the first part of the second compressed data segment will cross the boundary, wherein the first exclusive range and the second exclusive range are on a same side of the boundary.

18. The computing device of claim 17, wherein means for storing the first compressed data segment at the first offset address comprises means for storing a second part of the first compressed data segment within the first exclusive range.

19. The computing device of claim 17, further comprising means for calculating either the first offset or the second offset to store the first compressed data segment and the second compressed data segment together to completely fill at least one cache line including the cache line within the second exclusive range.

20. The computing device of claim 19, wherein means for calculating either the first offset or the second offset to store the first compressed data segment and the second compressed data segment together to completely fill the at least one cache line comprises means for calculating either the first offset or the second offset to store the first compressed data segment and the second compressed data segment together to contiguous cache lines.

21. The computing device of claim 17, wherein the data size of the first compressed data segment includes a first compression ratio of the first compressed data segment and the data size of the second compressed data segment includes a second compression ratio of the second compressed data segment, and the computing device further comprising:
  means for calculating the first offset using the first compression ratio of the first compressed data segment and the first base address; and
  means for calculating the second offset using the second compression ratio of the second compressed data segment and the second base address.

22. The computing device of claim 21, wherein means for calculating the first offset address or the second offset address comprises means for calculating the first offset address independent of the second compression ratio or calculating the second offset address independent of the first compression ratio.

23. The computing device of claim 17, further comprising means for offsetting all base addresses, including the first base address and the second base address, by a same amount.

24. The computing device of claim 17, wherein the first part of the first compressed data segment is all of the first compressed data segment.

25. A non-transitory processor-readable storage medium having stored thereon processor-executable instructions configured to cause a processor to perform operations comprising:
  offsetting a first base address of a first exclusive range in a cache of a first source data segment by a first offset related to a data size of a first compressed data segment to produce a first offset address in the cache for the first compressed data segment;
  storing the first compressed data segment at the first offset address with a first part of the first compressed data segment on a first part of a cache line within a second exclusive range of a second source data;
  offsetting a second base address of the second exclusive range in the cache by a second offset related to a data size of a second compressed data segment to produce a second offset address in the cache for the second compressed data segment;
  storing the second compressed data segment at the second offset address with a first part of the second compressed data segment on at least a second part of the cache line within the second exclusive range;
  determining whether storing a second part of the second compressed data segment contiguous with the first part of the second compressed data segment will cross a boundary; and
  storing the second part of the second compressed data segment at a third offset address within the first exclusive range in response to determining that storing the second part of the second compressed data segment contiguous with the first part of the second compressed data segment will cross the boundary, wherein the first exclusive range and the second exclusive range are on a same side of the boundary.

26. The non-transitory processor-readable storage medium of claim 25, wherein the stored processor-executable instructions are configured to cause the processor to perform operations such that storing the first compressed data segment at the first offset address comprises storing a second part of the first compressed data segment within the first exclusive range.

27. The non-transitory processor-readable storage medium of claim 25, wherein the stored processor-executable instructions are configured to cause the processor to perform operations further comprising calculating either the first offset or the second offset to store the first compressed data segment and the second compressed data segment together to completely fill at least one cache line including the cache line within the second exclusive range.

28. The non-transitory processor-readable storage medium of claim 27, wherein the stored processor-executable instructions are configured to cause the processor to perform operations such that calculating either the first offset or the second offset to store the first compressed data segment and the second compressed data segment together to completely fill the at least one cache line comprises calculating either the first offset or the second offset to store the first compressed data segment and the second compressed data segment together to contiguous cache lines.

29. The non-transitory processor-readable storage medium of claim 25, wherein the data size of the first compressed data segment includes a first compression ratio of the first compressed data segment and the data size of the second compressed data segment includes a second compression ratio of the second compressed data segment, and
wherein the stored processor-executable instructions are configured to cause the processor to perform operations further comprising:
calculating the first offset using the first compression ratio of the first compressed data segment and the first base address; and
calculating the second offset using the second compression ratio of the second compressed data segment and the second base address.

30. The non-transitory processor-readable storage medium of claim 29, wherein the stored processor-executable instructions are configured to cause the processor to perform operations such that calculating the first offset or the second offset comprises calculating the first offset independent of the second compression ratio or calculating the second offset independent of the first compression ratio.

31. The non-transitory processor-readable storage medium of claim 25, wherein the stored processor-executable instructions are configured to cause the processor to perform operations further comprising offsetting all base addresses, including the first base address and the second base address, by a same amount.

32. The non-transitory processor-readable storage medium of claim 25, wherein the first part of the first compressed data segment is all of the first compressed data segment.

* * * * *